US012669363B1

(12) United States Patent
Moore et al.

(10) Patent No.: US 12,669,363 B1
(45) Date of Patent: Jun. 30, 2026

(54) TANK SENSORS

(71) Applicant: MOPEKA PRODUCTS LLC, New Braunfels, TX (US)

(72) Inventors: Joel Reese Moore, New Braunfels, TX (US); Jonathan Louis Kaufmann, Shavano Park, TX (US); Jason Duane Peck, Leander, TX (US)

(73) Assignee: Mopeka Products LLC, New Braunfels, TX (US)

( * ) Notice: Subject to any disclaimer, the term of this patent is extended or adjusted under 35 U.S.C. 154(b) by 141 days.

(21) Appl. No.: 17/160,273

(22) Filed: Jan. 27, 2021

Related U.S. Application Data

(60) Provisional application No. 62/966,452, filed on Jan. 27, 2020.

(51) Int. Cl.
    *G01F 23/80*     (2022.01)
    *G01F 23/20*     (2006.01)

(52) U.S. Cl.
    CPC .......... *G01F 23/802* (2022.01); *G01F 23/205* (2013.01)

(58) Field of Classification Search
    CPC .. G01F 23/802; G01F 23/296; G01F 23/2962; G01F 23/2965; G01F 23/2968
    See application file for complete search history.

(56) References Cited

U.S. PATENT DOCUMENTS

| | | | |
|---|---|---|---|
| 3,100,885 A | 8/1963 | Welkowitz et al. | |
| 3,603,149 A | 9/1971 | McKown | |
| 4,145,914 A | * | 3/1979 | Newman ................. G01F 1/002 |
| | | | 331/25 |
| 4,203,324 A | * | 5/1980 | Baumoel ............. G01F 23/2965 |
| | | | 367/908 |
| 4,228,530 A | * | 10/1980 | Bergey ................... G01S 15/14 |
| | | | 367/908 |
| 4,596,144 A | * | 6/1986 | Panton ................ G01F 23/2962 |
| | | | 73/620 |

(Continued)

FOREIGN PATENT DOCUMENTS

| CN | 202815608 U | 3/2013 |
|---|---|---|
| CN | 108548586 B | 9/2018 |

(Continued)

OTHER PUBLICATIONS

Custom Non-Invasive and Standard Ultrasonic Sensors, Strain Measurement Devices, smdsensors.com, accessed: Jun. 2016, downloaded at https://www.smdsensors.com/continuous-ultrasonic-liquid-level-sensorsolutions/ pp. 1.

(Continued)

*Primary Examiner* — John Fitzgerald
(74) *Attorney, Agent, or Firm* — Mackey Law Firm PLLC

(57)           ABSTRACT

A method of measuring a level of fluid in a tank can include transmitting an energy pulse from an emitter mounted to a wall of the tank and detecting a plurality of return pulses at a detector mounted to the wall of the tank. A plurality of periods between the pulses can be calculated or timed. In at least one embodiment, at least two of the periods can be scored or weighted. A distance between the fluid and a top of the tank can be calculated or determined according to the scoring utilizing at least two of the periods. A signal indicative of the level in the tank can be provided.

9 Claims, 18 Drawing Sheets

(56) References Cited

U.S. PATENT DOCUMENTS

| | | | | |
|---|---|---|---|---|
| 4,770,038 | A * | 9/1988 | Zuckerwar | F17C 13/021 |
| | | | | 367/908 |
| 4,901,245 | A | 2/1990 | Olson et al. | |
| 4,992,998 | A * | 2/1991 | Woodward | G01F 23/2962 |
| | | | | 367/901 |
| 5,131,271 | A * | 7/1992 | Haynes | G01S 7/52004 |
| | | | | 367/908 |
| 5,319,974 | A * | 6/1994 | Lenz | G01S 15/88 |
| | | | | 367/908 |
| 5,335,545 | A * | 8/1994 | Leszczynski | G01F 23/2962 |
| | | | | 73/290 V |
| 5,400,376 | A | 3/1995 | Trudeau | |
| 5,586,085 | A | 12/1996 | Lichte | |
| 5,778,726 | A | 7/1998 | Muller et al. | |
| 5,793,705 | A | 8/1998 | Gazis et al. | |
| 5,962,952 | A | 10/1999 | Gluszyk et al. | |
| 6,078,280 | A * | 6/2000 | Perdue | G01S 7/4004 |
| | | | | 73/290 R |
| 6,142,015 | A * | 11/2000 | Getman | G01F 23/2961 |
| | | | | 73/861.27 |
| 6,212,943 | B1 * | 4/2001 | Maltby | G01N 29/036 |
| | | | | 73/61.49 |
| 6,246,154 | B1 | 6/2001 | Gluszyk et al. | |
| 6,581,459 | B1 | 6/2003 | Lichtenfels, II | |
| 6,650,280 | B2 | 11/2003 | Arndt et al. | |
| 6,829,932 | B2 * | 12/2004 | Laun | G01F 23/284 |
| | | | | 73/290 V |
| 6,925,870 | B2 | 8/2005 | Pappas et al. | |
| 7,114,390 | B2 | 10/2006 | Lizon et al. | |
| 7,174,769 | B2 | 2/2007 | McSheffrey, Jr. et al. | |
| 7,174,783 | B2 | 2/2007 | McSheffrey, Jr. et al. | |
| 7,287,425 | B2 | 10/2007 | Lagergren | |
| 7,298,278 | B2 | 11/2007 | Miller et al. | |
| 7,418,860 | B2 | 9/2008 | Austerlitz et al. | |
| 7,604,600 | B2 * | 10/2009 | Umemura | G01S 15/8979 |
| | | | | 600/443 |
| 7,905,143 | B2 | 3/2011 | Lagergren | |
| 8,104,341 | B2 | 1/2012 | Lagergren et al. | |
| 8,315,825 | B2 | 11/2012 | Sai | |
| 8,412,473 | B2 | 4/2013 | Woltring et al. | |
| 8,630,814 | B2 | 1/2014 | Cheng et al. | |
| 8,689,624 | B2 | 4/2014 | Agam et al. | |
| 8,813,570 | B2 * | 8/2014 | Matsumoto | G01B 17/025 |
| | | | | 73/632 |
| 8,844,352 | B2 | 9/2014 | Nisson et al. | |
| 9,222,825 | B2 | 12/2015 | Lienenkamp | |
| 9,354,100 | B2 * | 5/2016 | Griessbaum | G01S 13/103 |
| 9,606,227 | B2 * | 3/2017 | Baba | G10K 11/346 |
| 9,615,767 | B2 | 4/2017 | Gaw et al. | |
| 9,798,367 | B2 | 10/2017 | Huang et al. | |
| 9,897,471 | B2 | 2/2018 | Wiest et al. | |
| 9,952,318 | B2 | 4/2018 | Bartov et al. | |
| 10,101,193 | B2 | 10/2018 | Pfeiffer et al. | |
| 10,180,343 | B2 | 1/2019 | Merker et al. | |
| 10,327,948 | B2 | 6/2019 | Jacobsen et al. | |
| 10,345,135 | B2 | 7/2019 | Tokarev et al. | |
| 10,513,967 | B2 | 12/2019 | Rollinger et al. | |
| 10,571,328 | B2 | 2/2020 | Moore et al. | |
| 10,788,352 | B1 | 9/2020 | Beiswinger | |
| 10,830,631 | B2 | 11/2020 | Merker et al. | |
| 2004/0035873 | A1 | 2/2004 | Wheeler et al. | |
| 2005/0189275 | A1 | 9/2005 | Stewart et al. | |
| 2006/0037392 | A1 * | 2/2006 | Carkner | G01F 23/2962 |
| | | | | 73/290 V |
| 2009/0013778 | A1 * | 1/2009 | Schroth | G01F 23/2962 |
| | | | | 73/290 V |
| 2010/0126267 | A1 | 5/2010 | Agam et al. | |
| 2011/0029262 | A1 | 2/2011 | Barkhouse | |
| 2013/0263657 | A1 | 10/2013 | Sides | |
| 2013/0293388 | A1 | 11/2013 | Ingalsbe et al. | |
| 2014/0304528 | A1 | 10/2014 | Huang et al. | |
| 2016/0116318 | A1 | 4/2016 | Weist et al. | |
| 2016/0146659 | A1 * | 5/2016 | Saltzgiver | B65D 51/245 |
| | | | | 73/304 C |
| 2016/0163175 | A1 | 6/2016 | Jenkins | |
| 2020/0171539 | A1 * | 6/2020 | Wiest | G10K 11/004 |

FOREIGN PATENT DOCUMENTS

| | | |
|---|---|---|
| CN | 110646052 A | 1/2020 |
| DE | 3703658 A1 | 8/1988 |
| DE | 20041028547 A1 | 6/2004 |
| DE | 102014210077 A1 | 12/2015 |
| WO | 9717591 A2 | 5/1997 |
| WO | 2011051949 A1 | 5/2004 |

OTHER PUBLICATIONS

Li, Peng, et al., "An Accurate Detection for Dynamic Liquid Level Bases on Mimo Ultrasonic Transducer Array," IEEE Transactions on Instrumentation and Measurement 64.3 (2015): 582595 downloaded at http://ieeexplore.ieee.org/el7/19.4407674/06912012.pdf?amumber=6912012 pp. 14.

Orzechowski, Stephan W., "Development of an Effective Fuel Level Sensing Technology for Propane Powered Vehicles," (2000), http:www.nlcbnc.va/obj/s4/f2/dsl1/tape8/PQDD_0005/MQ45619.pdf Publisher: National Library of Canada, pp. 155.

Propane Tank Gauge Level Gas Grill Ultrasound By Gaslock Classic, Terapeak, terapeak, terapeak.com, accessed: Jun. 2016, downloaded on http://www.terapeak.com/worth/propanetankguage levelgasgrillultrasoundgbygaslockclassic/252303994808.

Thruwall—Non-invasive Technology, Hycontrol Level Measurement Solutions, Hycontrol.com, accessed Jun. 28, 2016, http://hycontrol.com/levelmeasurement/viewproduct.php?id=14.

Jun. 12, 2018 Letter from Eric M. Leppo to Michael C. Mackey.

* cited by examiner

| Pulses | T | Wght |
|---|---|---|
| 0 | | |
| 190 | 190 | 1.000 |
| 390 | 200 | 0.999 |
| 600 | 210 | 0.998 |
| 780 | 180 | 0.997 |
| 990 | 210 | 0.996 |
| 1190 | 200 | 0.995 |
| 1390 | 200 | 0.994 |
| 1600 | 210 | 0.993 |
| 1800 | 200 | 0.992 |
| 2000 | 200 | 0.991 |
| 2200 | 200 | 0.990 |
| 2390 | 190 | 0.989 |
| 2600 | 210 | 0.988 |
| 2810 | 210 | 0.987 |
| 3000 | 190 | 0.986 |
| 3190 | 190 | 0.985 |
| 3390 | 200 | 0.984 |
| 3610 | 220 | 0.983 |
| 3800 | 190 | 0.982 |
| 4000 | 200 | 0.981 |
| 4210 | 210 | 0.980 |
| 4400 | 190 | 0.979 |
| 4600 | 200 | 0.978 |
| 4800 | 200 | 0.977 |
| 5010 | 210 | 0.976 |
| 5210 | 200 | 0.975 |
| 5400 | 190 | 0.974 |
| 5600 | 200 | 0.973 |
| 5790 | 190 | 0.972 |
| 6000 | 210 | 0.971 |

| Value | Weight | Wg Avg |
|---|---|---|
| 180 | 0.997 | |
| 190 | 7.867 | |
| 200 | 11.829 | 200.008 |
| 210 | 7.889 | |
| 220 | 0.983 | |

FIG. 12

| Pulses | T | FIR | Delta Wg |
|---|---|---|---|
| 0 | | | |
| 190 | 190 | 200 | 1.053 |
| 390 | 200 | 195 | 0.500 |
| 600 | 210 | 198 | 0.330 |
| 780 | 180 | 200 | 0.256 |
| 990 | 210 | 200 | 0.202 |
| 1190 | 200 | 200 | 0.168 |
| 1390 | 200 | 204 | 0.147 |
| 1600 | 210 | 202 | 0.126 |
| 1800 | 200 | 202 | 0.112 |
| 2000 | 200 | 200 | 0.100 |
| 2200 | 200 | 200 | 0.091 |
| 2390 | 190 | 202 | 0.085 |
| 2600 | 210 | 200 | 0.077 |
| 2810 | 210 | 198 | 0.070 |
| 3000 | 190 | 200 | 0.067 |
| 3190 | 190 | 202 | 0.063 |
| 3390 | 200 | 198 | 0.058 |
| 3610 | 220 | 200 | 0.055 |
| 3800 | 190 | 204 | 0.054 |
| 4000 | 200 | 202 | 0.051 |
| 4210 | 210 | 198 | 0.047 |
| 4400 | 190 | 200 | 0.045 |
| 4600 | 200 | 202 | 0.044 |
| 4800 | 200 | 200 | 0.042 |
| 5010 | 210 | 200 | 0.040 |
| 5210 | 200 | 200 | 0.038 |
| 5400 | 190 | 198 | 0.037 |
| 5600 | 200 | 198 | 0.035 |
| 5790 | 190 | 198 | 0.034 |
| 6000 | 210 | 200 | 0.033 |

| Value | Weight | Wg Avg |
|---|---|---|
| 195 | 0.500 | |
| 198 | 0.612 | |
| 200 | 2.268 | 199.922 |
| 202 | 0.481 | |
| 204 | 0.200 | |

FIG. 13

| Pulses | T | FIR | Atten | Delta Wg | Weight |
|--------|-----|-----|-------|----------|--------|
| 0 | | | | | |
| 190 | 190 | 200 | 1.000 | 1.053 | 1.053 |
| 390 | 200 | 195 | 0.999 | 0.500 | 0.500 |
| 600 | 210 | 198 | 0.998 | 0.330 | 0.329 |
| 780 | 180 | 200 | 0.997 | 0.256 | 0.256 |
| 990 | 210 | 200 | 0.996 | 0.202 | 0.201 |
| 1190 | 200 | 200 | 0.995 | 0.168 | 0.167 |
| 1390 | 200 | 204 | 0.994 | 0.147 | 0.146 |
| 1600 | 210 | 202 | 0.993 | 0.126 | 0.125 |
| 1800 | 200 | 202 | 0.992 | 0.112 | 0.111 |
| 2000 | 200 | 200 | 0.991 | 0.100 | 0.099 |
| 2200 | 200 | 200 | 0.990 | 0.091 | 0.090 |
| 2390 | 190 | 202 | 0.989 | 0.085 | 0.084 |
| 2600 | 210 | 200 | 0.988 | 0.077 | 0.076 |
| 2810 | 210 | 198 | 0.987 | 0.070 | 0.070 |
| 3000 | 190 | 200 | 0.986 | 0.067 | 0.066 |
| 3190 | 190 | 202 | 0.985 | 0.063 | 0.062 |
| 3390 | 200 | 198 | 0.984 | 0.058 | 0.057 |
| 3610 | 220 | 200 | 0.983 | 0.055 | 0.054 |
| 3800 | 190 | 204 | 0.982 | 0.054 | 0.053 |
| 4000 | 200 | 202 | 0.981 | 0.051 | 0.050 |
| 4210 | 210 | 198 | 0.980 | 0.047 | 0.046 |
| 4400 | 190 | 200 | 0.979 | 0.045 | 0.045 |
| 4600 | 200 | 202 | 0.978 | 0.044 | 0.043 |
| 4800 | 200 | 200 | 0.977 | 0.042 | 0.041 |
| 5010 | 210 | 200 | 0.976 | 0.040 | 0.039 |
| 5210 | 200 | 200 | 0.975 | 0.038 | 0.037 |
| 5400 | 190 | 198 | 0.974 | 0.037 | 0.036 |
| 5600 | 200 | 198 | 0.973 | 0.035 | 0.034 |
| 5790 | 190 | 198 | 0.972 | 0.034 | 0.033 |
| 6000 | 210 | 200 | 0.971 | 0.033 | 0.032 |

| Value | Weight | Wg Avg |
|-------|--------|--------|
| 195 | 0.500 | |
| 198 | 0.606 | |
| 200 | 2.256 | 199.922 |
| 202 | 0.475 | |
| 204 | 0.199 | |

| Pulses | Ampltd | T | Delta Wg | Weight |
|---|---|---|---|---|
| 0 | | | | |
| 190 | 1.16 | 190 | 0.981 | 1.14 |
| 390 | 0.95 | 200 | 0.961 | 0.91 |
| 600 | 0.77 | 210 | 0.94 | 0.72 |
| 780 | 0.64 | 180 | 0.922 | 0.59 |
| 990 | 0.52 | 210 | 0.901 | 0.47 |
| 1190 | 0.43 | 200 | 0.881 | 0.38 |
| 1390 | 0.35 | 200 | 0.861 | 0.30 |
| 1600 | 0.28 | 210 | 0.84 | 0.24 |
| 1800 | 0.23 | 200 | 0.82 | 0.19 |
| 2000 | 0.19 | 200 | 0.8 | 0.15 |
| 2200 | 0.16 | 200 | 0.78 | 0.12 |
| 2390 | 0.13 | 190 | 0.761 | 0.10 |
| 2600 | 0.10 | 210 | 0.74 | 0.08 |
| 2810 | 0.08 | 210 | 0.719 | 0.06 |
| 3000 | 0.07 | 190 | 0.7 | 0.05 |
| 3190 | 0.06 | 190 | 0.681 | 0.04 |
| 3390 | 0.05 | 200 | 0.661 | 0.03 |
| 3610 | 0.04 | 220 | 0.639 | 0.02 |
| 3800 | 0.03 | 190 | 0.62 | 0.02 |
| 4000 | 0.03 | 200 | 0.6 | 0.02 |
| 4210 | 0.02 | 210 | 0.579 | 0.01 |
| 4400 | 0.02 | 190 | 0.56 | 0.01 |
| 4600 | 0.01 | 200 | 0.54 | 0.01 |
| 4800 | 0.01 | 200 | 0.52 | 0.01 |
| 5010 | 0.01 | 210 | 0.499 | 0.00 |
| 5210 | 0.01 | 200 | 0.479 | 0.00 |
| 5400 | 0.01 | 190 | 0.46 | 0.00 |
| 5600 | 0.01 | 200 | 0.44 | 0.00 |
| 5790 | 0.00 | 190 | 0.421 | 0.00 |
| 6000 | 0.00 | 210 | 0.4 | 0.00 |

FIG. 18

| Value | Weight | FIR-5 | Wg Avg |
|-------|--------|-------|--------|
| 160 | | 0.15 | |
| 170 | | 0.58 | |
| 180 | 0.59 | 1.43 | |
| 190 | 1.36 | 2.29 | |
| 200 | 2.11 | 2.59 | 199.79 |
| 210 | 1.58 | 2.14 | |
| 220 | 0.02 | 1.17 | |
| 230 | | 0.40 | |
| 240 | | 0.01 | |

FIG. 19

| Value | Weight | FIR-5 | Wg Avg |
|-------|--------|-------|--------|
| 160 | | 0.15 | |
| 170 | | 0.55 | |
| 180 | 0.59 | 1.36 | |
| 190 | 1.24 | 2.16 | |
| 200 | 2.05 | 2.45 | 199.74 |
| 210 | 1.43 | 1.99 | |
| 220 | | 1.08 | |
| 230 | | 0.36 | |
| 240 | | - | |

FIG. 20

| Value | Weight | FIR-5 | Wg Avg |
|-------|--------|-------|--------|
| 160 | | 0.15 | |
| 170 | | 0.55 | |
| 180 | 0.59 | 1.36 | |
| 190 | 1.24 | 2.18 | |
| 200 | 2.05 | 2.48 | 199.79 |
| 210 | 1.51 | 2.04 | |
| 220 | | 1.12 | |
| 230 | | 0.38 | |
| 240 | | - | |

FIG. 21

TANK SENSORS

CROSS REFERENCE TO RELATED APPLICATIONS

This application claims the benefit of U.S. Provisional Patent Application No. 62/966,452 filed Jan. 27, 2020, and is a continuation in part of U.S. patent application Ser. No. 16/801,135 filed Feb. 25, 2020, which is a continuation in part of U.S. patent application Ser. No. 15/249,600 filed Aug. 29, 2016, which claims the benefit of U.S. Provisional Patent Application No. 62/211,713 filed Aug. 29, 2015, the entire contents of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure generally relates to level sensors and more specifically relates to sensor arrangements for determining the amount of liquid within tanks.

Description of the Related Art

Accurately monitoring liquid levels in plastic tanks can be challenging, particularly when the liquid contains contaminants, solids and/or a variety of different liquids. For example, in the recreational vehicle ("RV") industry, each RV typically has three tanks: a potable water tank, a gray water tank (capturing wastewater that is not from toilets) and a black water tank that holds sewage water from the toilet(s). Accurately monitoring the level of a black water tank can be especially problematic because of the variable density and contaminants in the sewer water, such as due to the presence of toilet paper among other things. The typical industry solution has been electrical probes placed at variable heights that can detect a change in electrical properties when in contact with the liquid level. However, these conventional solutions can be problematic because they can malfunction or even fail when sewage buildup occurs on the probes. While some systems can be treated with chemicals to help protect against buildup and malfunction, such a process introduces extra headache and expense and often comes with varying success. Also, because there are typically multiple holes through the body of the tank to accommodate placement of the probes below the liquid level, conventional solutions often include multiple potential leak points. Accordingly, a need exists in the art for improved devices, systems and methods for monitoring liquid levels in tanks.

BRIEF SUMMARY OF THE INVENTION

In at least one embodiment, a tank level monitoring system according to the disclosure can include one or more ultrasonic sensors configured to be coupled to the top of a tank and to assess liquid level in the tank in a top-down direction. In at least one embodiment, a tank level monitor-ing system according to the disclosure can include one or more ultrasonic sensors configured to be coupled to the bottom of a tank and to assess liquid level in the tank in a bottom-up direction. In at least one embodiment, a tank level monitoring system according to the disclosure can include one or more ultrasonic sensors configured to be coupled to the sidewall of a tank and to assess liquid level in the tank in a horizontal, or angled, direction. One or more sensors can be configured to couple to an exterior surface of a tank. One or more sensors can include or be in the form of a cap or plug configured to couple to a tank. One or more sensors can be configured to sense tank level through one or more barriers, such as the wall of a tank or sensor body. One or more sensors can be configured to sense tank level through an opening in a sensor body disposed in fluid communication with space, such as air space, between the sensor and liquid residing in the tank.

In at least one embodiment, a method of measuring a level of a fluid in a tank according to the disclosure can include transmitting an energy pulse from an emitter mounted to a wall of the tank and detecting a plurality of return pulses at a detector mounted to the wall of the tank. A plurality of periods between the pulses can be calculated or timed. In at least one embodiment, at least two of the periods are scored or weighted. In at least one embodiment, a distance between the fluid and the wall of the tank can be calculated or determined according to the scoring utilizing at least two of the periods. In at least one embodiment, one or more signals indicative of a level in a tank can then be provided. In at least one embodiment, such a signal can be inversely related to the distance between a fluid and a wall of the tank.

In at least one embodiment, a tank level monitoring system according to the disclosure can include a housing configured to be coupled to a fluid containment tank, a transducer, and control circuitry coupled to the transducer. In at least one embodiment, the circuitry can cause the transducer to generate an energy pulse into the tank and utilize the transducer to detect return pulses reflected from a fluid/air interface or other media in the tank. In at least one embodiment, the circuitry can time a plurality of periods between pulses, score at least two of the periods, and determine a distance between the fluid/air interface and the wall of the tank according to the scoring utilizing at least two of the periods. In at least one embodiment, the circuitry can provide a signal indicative of a fluid level in the tank. The signal can be inversely related to the distance between the fluid and a wall of the tank.

BRIEF DESCRIPTION OF THE SEVERAL VIEWS OF THE DRAWINGS

FIG. 12 is a sample table produced in accordance with the disclosure, such as via one or more of the methods of FIG. 10, FIG. 11, FIG. 14, FIG. 15 and FIG. 17.

FIG. 13 is another sample table produced in accordance with the disclosure, such as via one or more of the methods of FIG. 10, FIG. 11, FIG. 14, FIG. 15 and FIG. 17.

FIG. 16 is a sample table produced in accordance with the disclosure, such as via one or more of the methods of FIG. 10, FIG. 11, FIG. 14, FIG. 15 and FIG. 17.

FIGS. 18-21 are sample tables produced in accordance with the disclosure, such as via one or more of the methods of FIG. 10, FIG. 11, FIG. 14, FIG. 15 and FIG. 17.

DETAILED DESCRIPTION OF THE INVENTION

Figure 1:
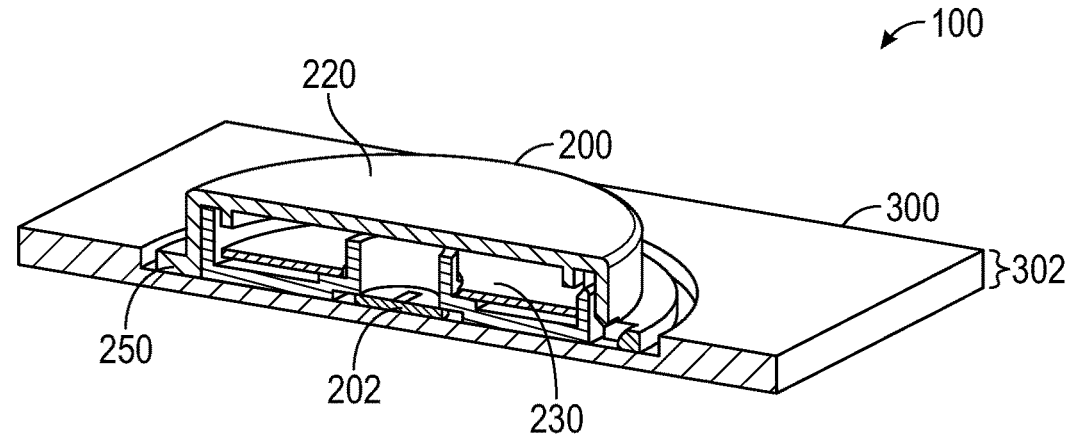
FIG. 1 is a schematic cross-sectional view of one of many embodiments of a level sensor system according to the disclosure.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions can include, and likely are not limited to, compliance with system-related, business-related, government-related and other constraints, which can vary by specific implementation, location and from time to time. While a developer's efforts might be complex and time-consuming in an absolute sense, such efforts would be, nevertheless, a routine undertaking for those of skill in this art having benefit of this disclosure. The inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Unless otherwise indicated, the term "liquid(s)" as used herein includes both pure liquids and impure liquids, including but not limited to mixtures, combinations of immiscible liquids and one or more liquids mixed or otherwise combined with one or more non-liquids.

Applicants have created improved devices, systems and methods for monitoring tank levels, including but not limited to liquid levels in plastic tanks and other tanks for holding water, gray water, black water and/or other substances, such as liquid propane gas (LPG), oil or fuel. Applicants have created devices, systems and methods for top-down monitoring of tank levels, i.e., monitoring of tank levels from the top of a tank downwardly, whether separately or in combination with other monitoring, such as from one or more locations beneath a level of liquid in a tank. Applicants have created devices, systems and methods for bottom-up monitoring of tank levels, i.e., monitoring of tank levels from the bottom of a tank upwardly, whether separately or in combination with one or more other locations. Applicants have created devices, systems and methods for tank level monitoring that are less prone to failure due to contamination and/or less prone to result in tank leakage.

In at least one embodiment, devices, systems and methods according to the disclosure can utilize a non-contact, ultrasonic technology to monitor one or more levels of liquid in a tank. However, instead of (or in addition to) using a bottom-mounted sensor that measures thru a tank wall and thru the liquid in the tank, one or more devices, systems and methods of the present disclosure can include one or more sensors configured to be coupled to the top of a tank and to utilize ultrasound waves broadcast thru air space above the liquid in the tank for determining tank level. Because the sensor(s) can be located at the top of the tank, even in embodiments where one or more holes are disposed through the tank body, the devices, systems and methods of the present disclosure can be less prone to result in leaking or, for instance, contamination such as sewage buildup, since contact between a sensor and the liquid in a tank typically will be rare or, in at least one embodiment, non-existent. One or more aspects and embodiments of the present disclosure are described in more detail below with reference to the Figures.

Figure 2:
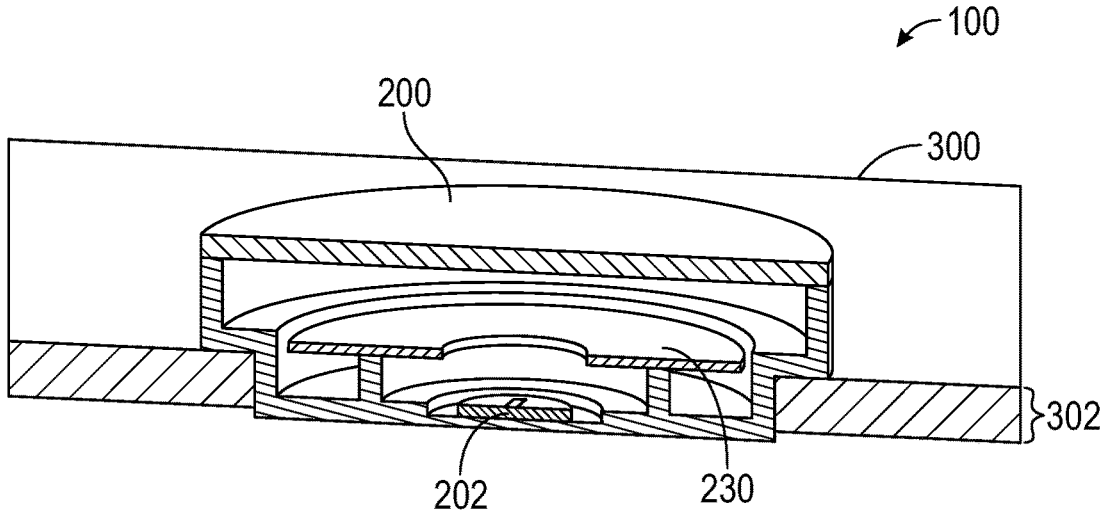
FIG. 2 is a schematic cross-sectional view of another of many embodiments of a level sensor system according to the disclosure.
Figure 3:
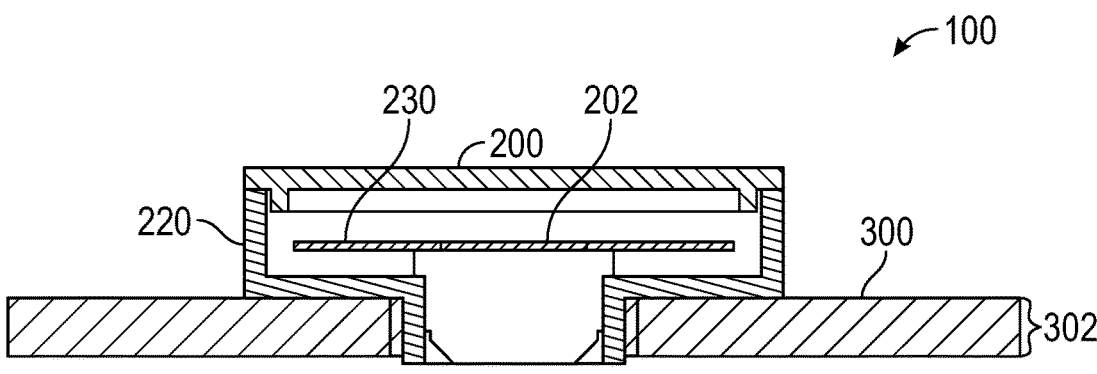
FIG. 3 is a schematic cross-sectional view of yet another of many embodiments of a level sensor system according to the disclosure.
Figure 4A:
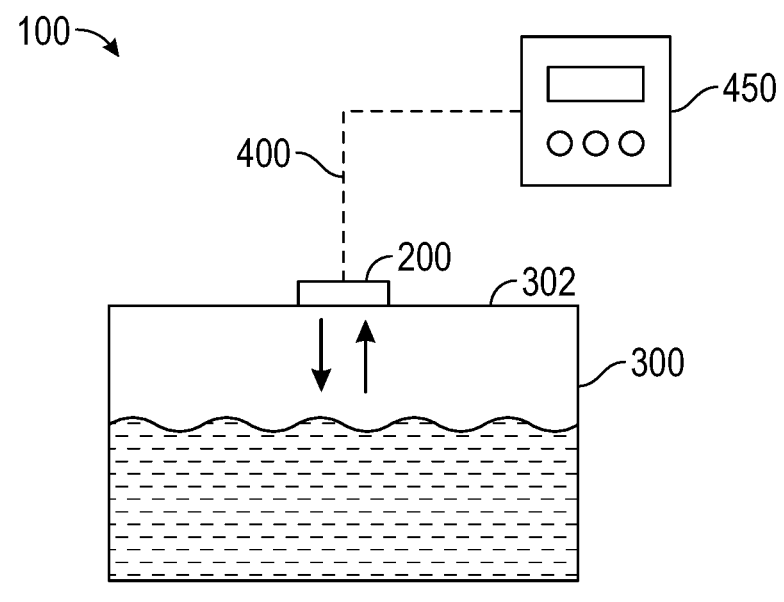
FIG. 4A is a schematic view of one of many embodiments of a level sensor system according to the disclosure.
Figure 4B:
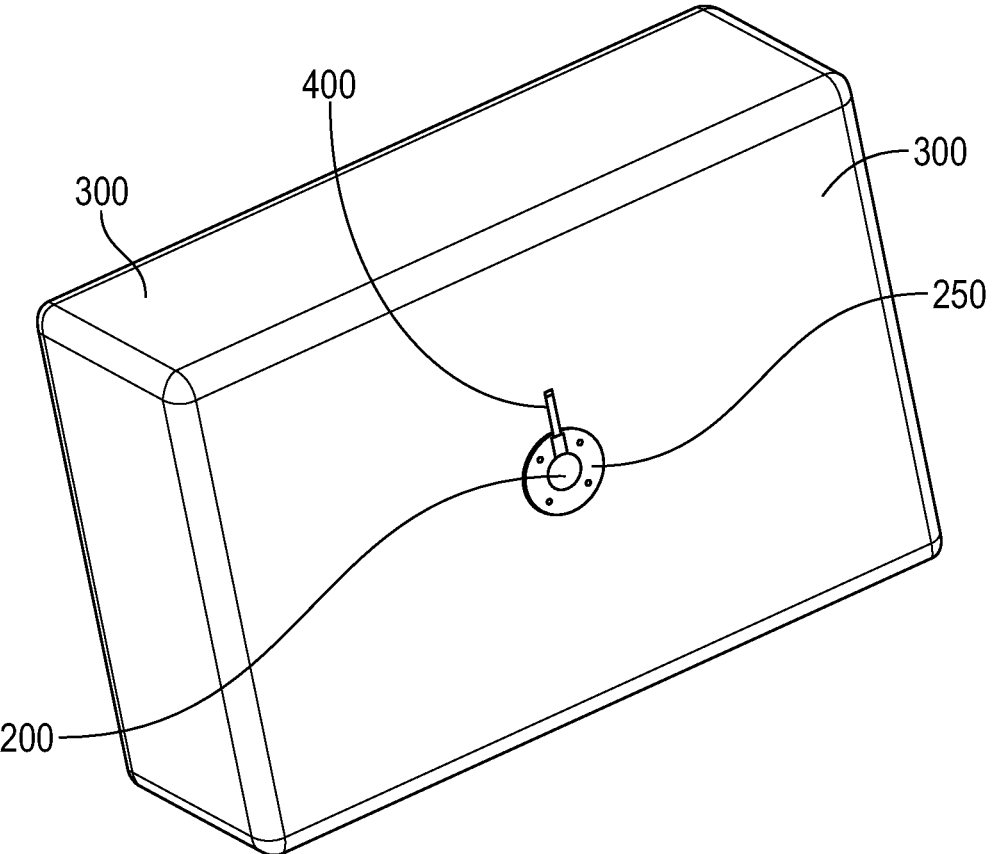
FIG. 4B is a perspective view of one of many embodiments of a level sensor system according to the disclosure.
Figure 5:
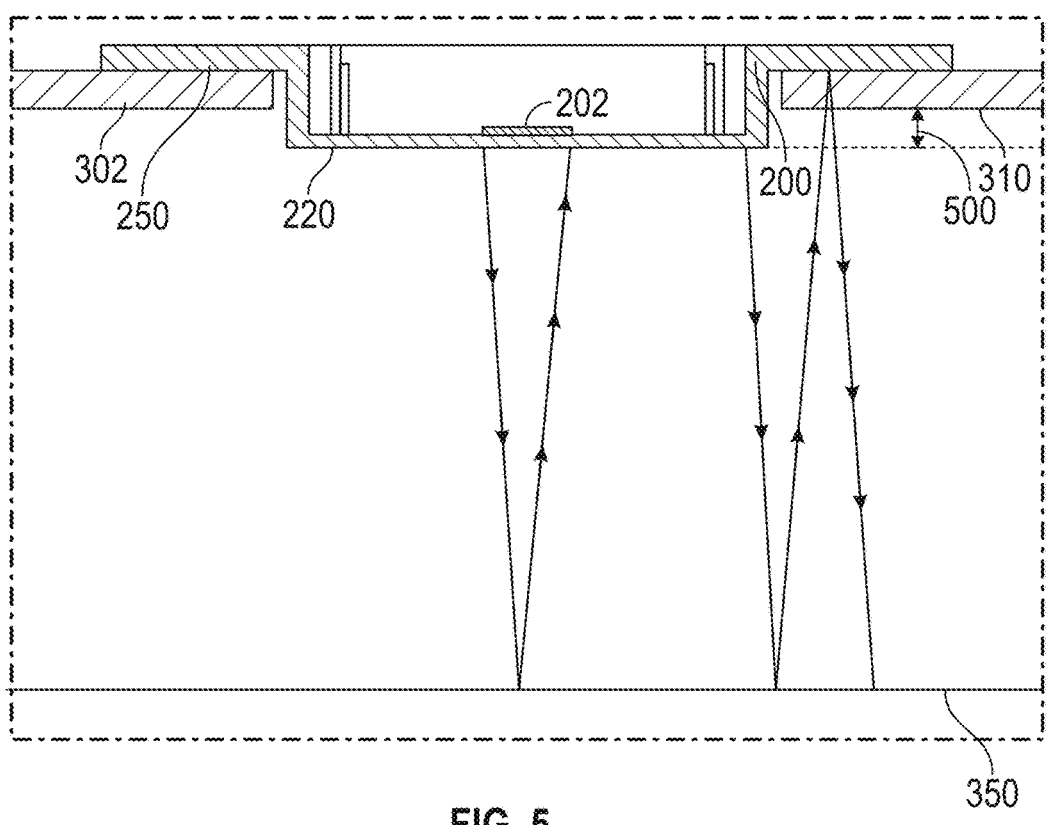
FIG. 5 is a schematic cross-sectional view of one of many embodiments of a level sensor system according to the disclosure.
Figure 6:
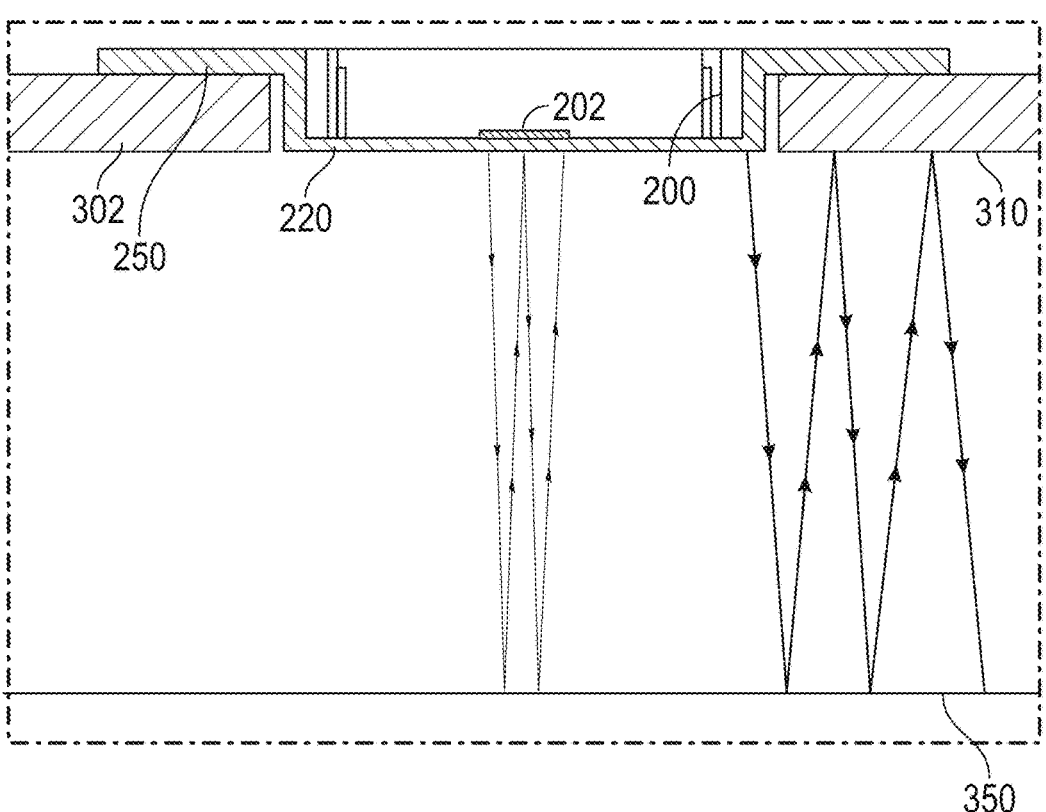
FIG. 6 is a schematic cross-sectional view of another of many embodiments of a level sensor system according to the disclosure.
Figure 7A:
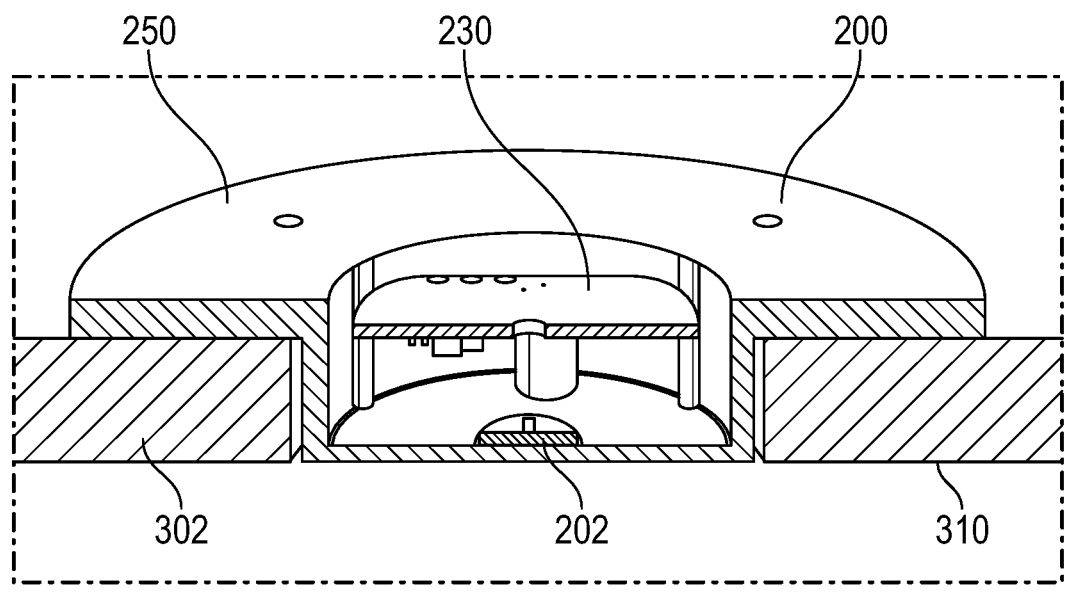
FIG. 7A is another schematic cross-sectional view of the embodiment of FIG. 6 according to the disclosure.
Figure 7B:
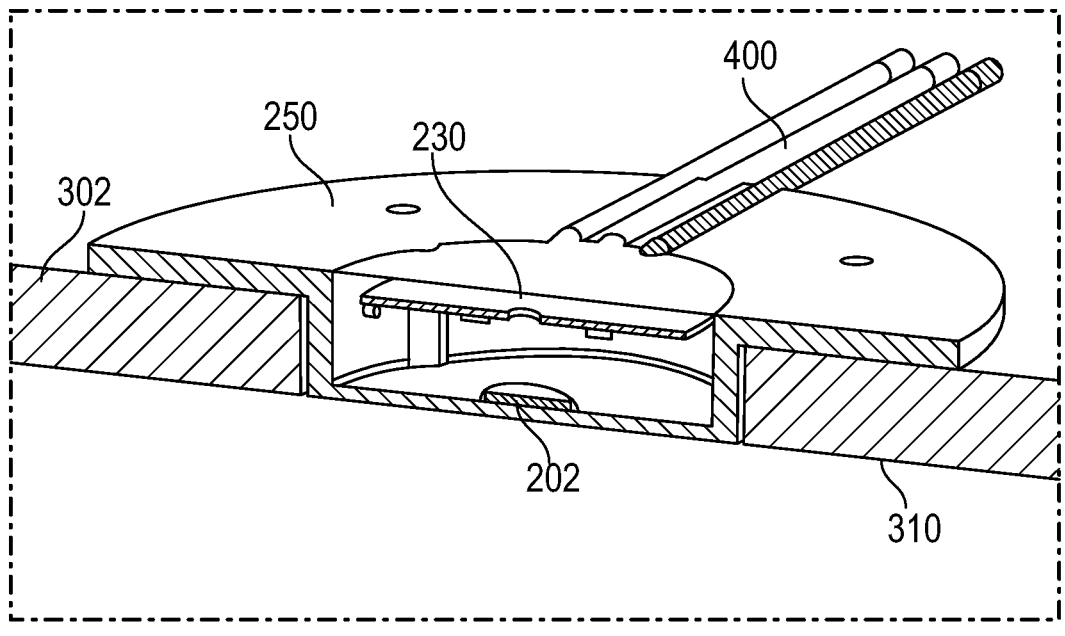
FIG. 7B is yet another schematic cross-sectional view of the embodiment of FIG. 6 according to the disclosure.
Figure 8:
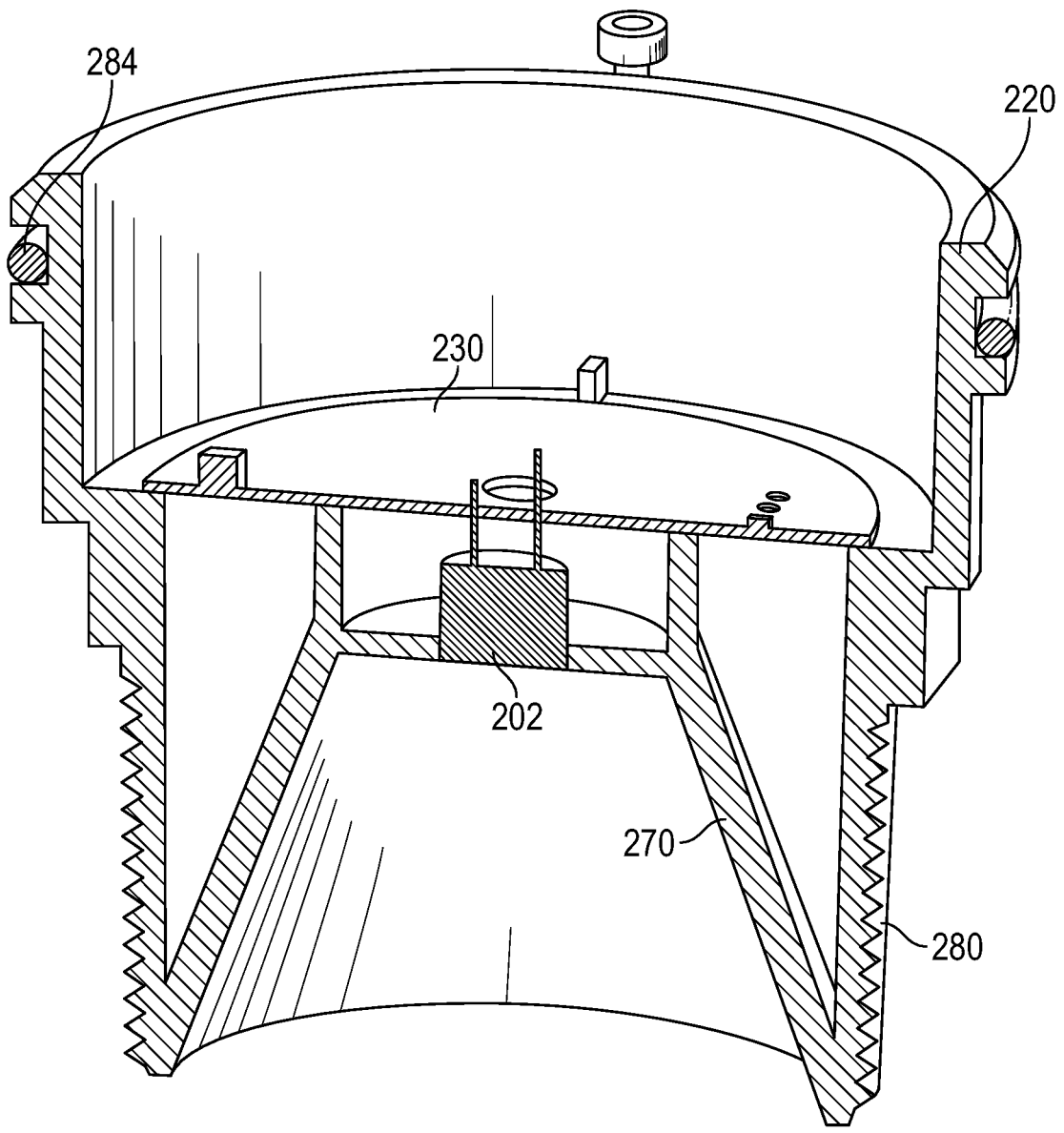
FIG. 8 is a schematic cross-sectional view of another of many embodiments of a level sensor system according to the disclosure.
Figure 9A:
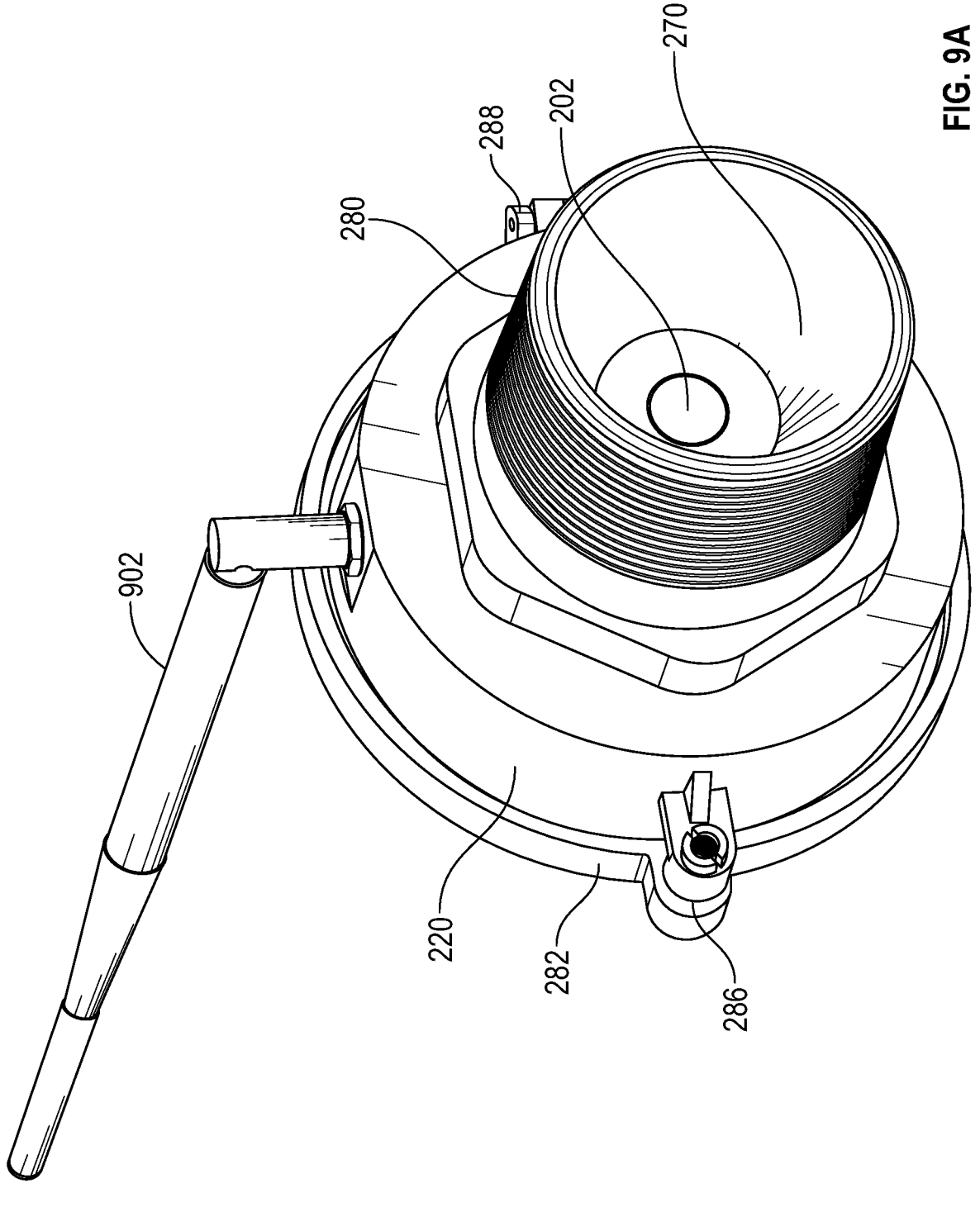
FIG. 9A is a perspective view of one of many embodiments of a level sensor system according to the disclosure.
Figure 9B:
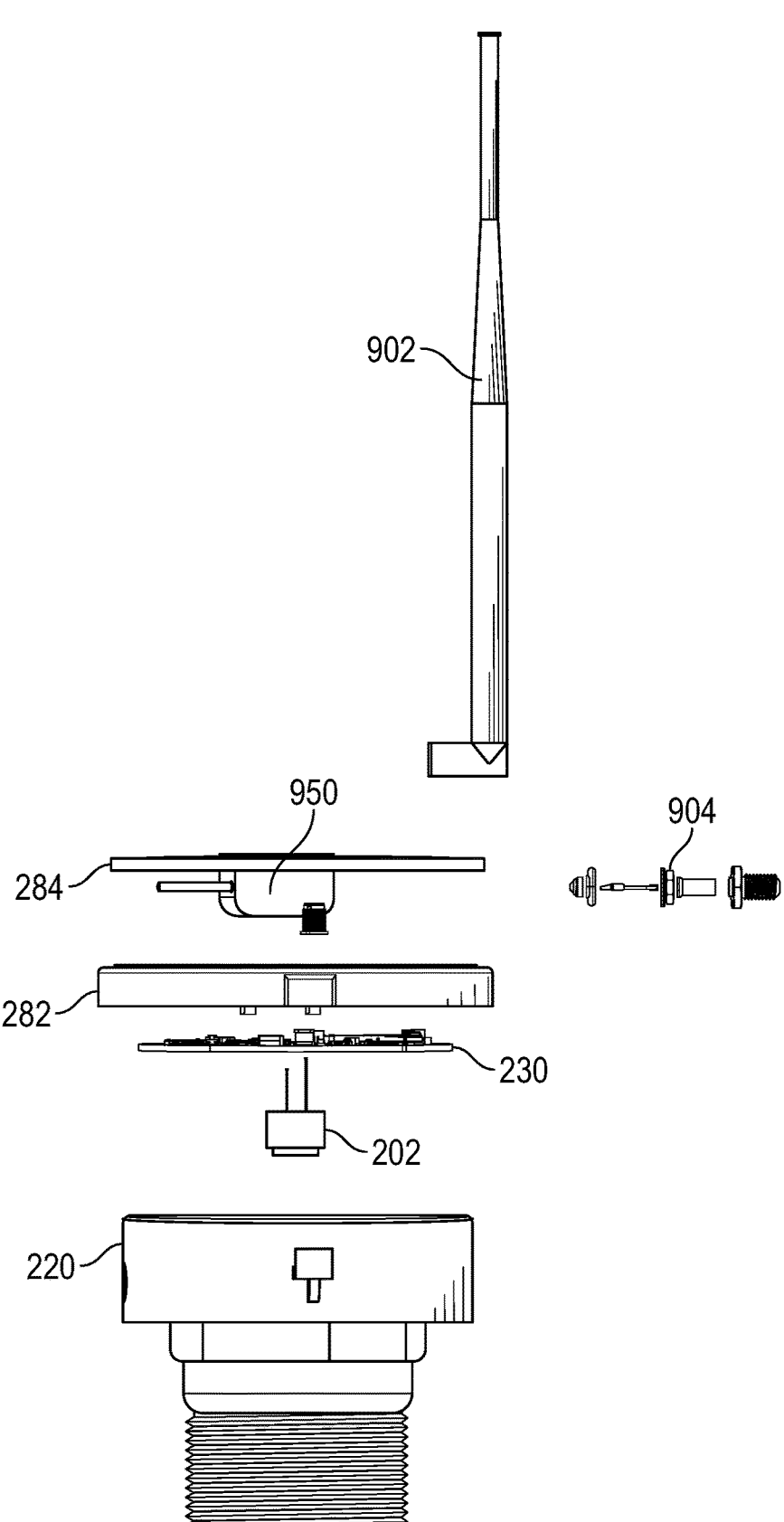
FIG. 9B is an exploded view of the embodiment of FIG. 9A.
Figure 9C:
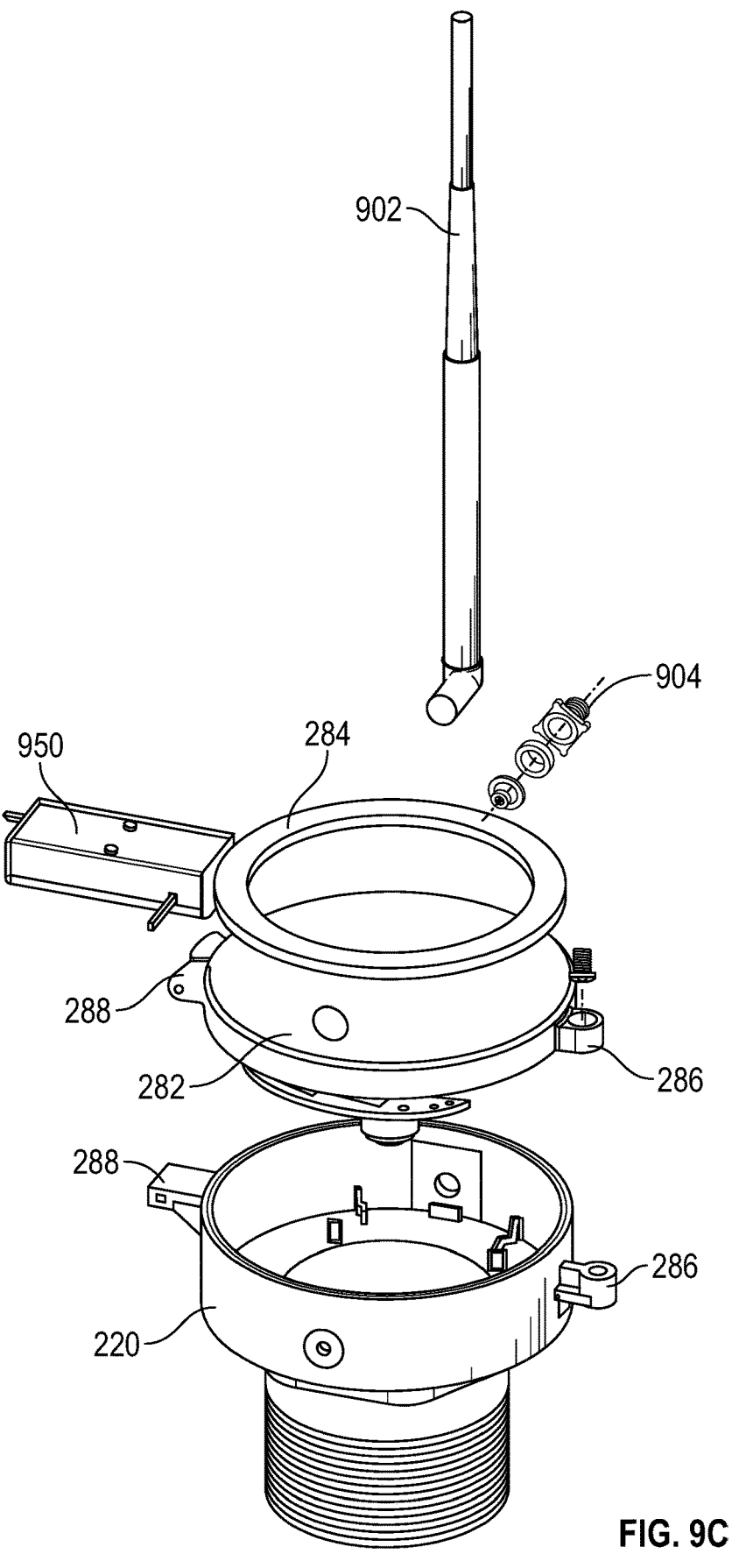
FIG. 9C is an exploded perspective view of the embodiment of FIG. 9A.
Figure 9D:
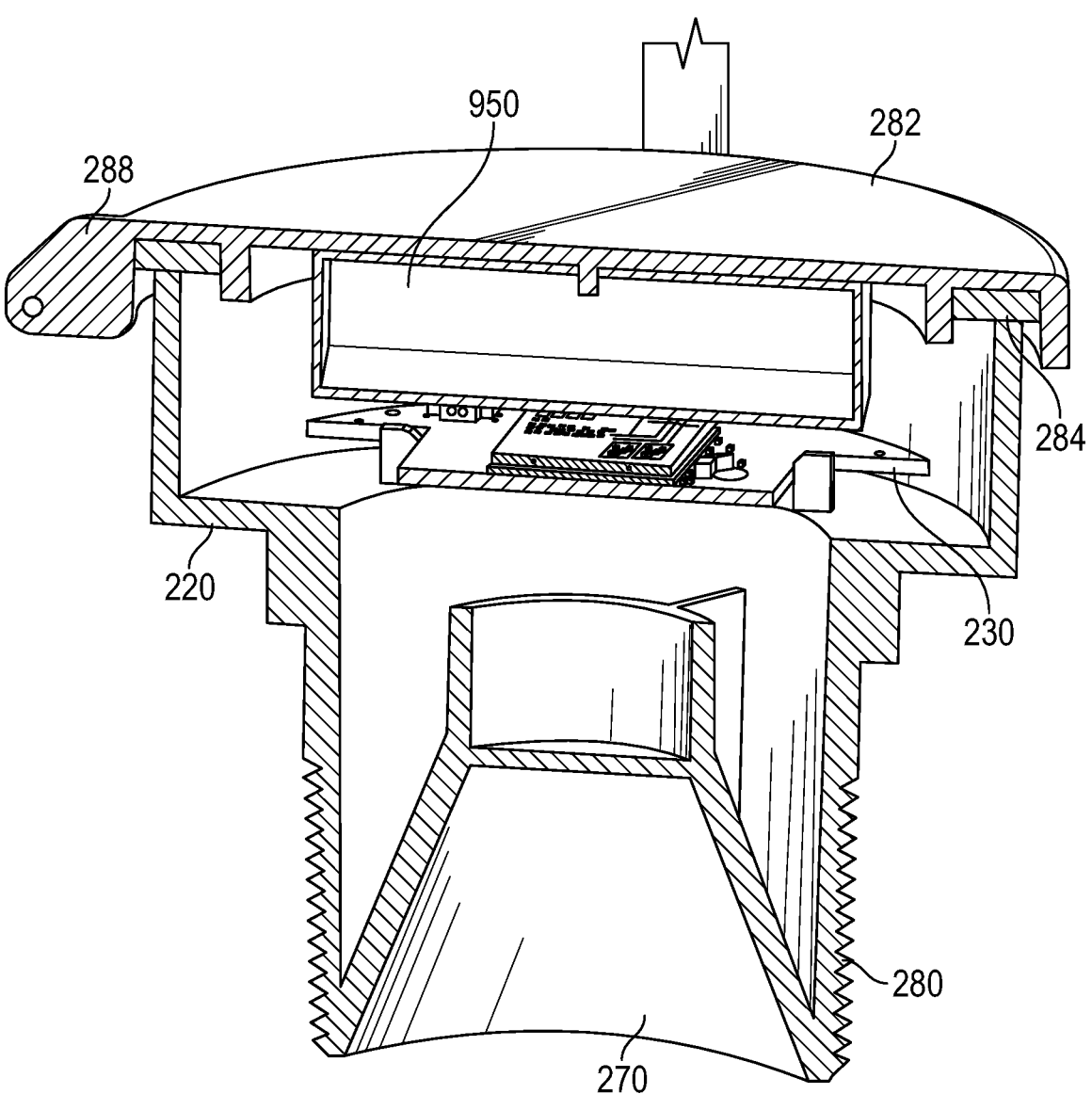
FIG. 9D is a partial cross-sectional perspective view of the embodiment of FIG. 9A.
Figure 9E:
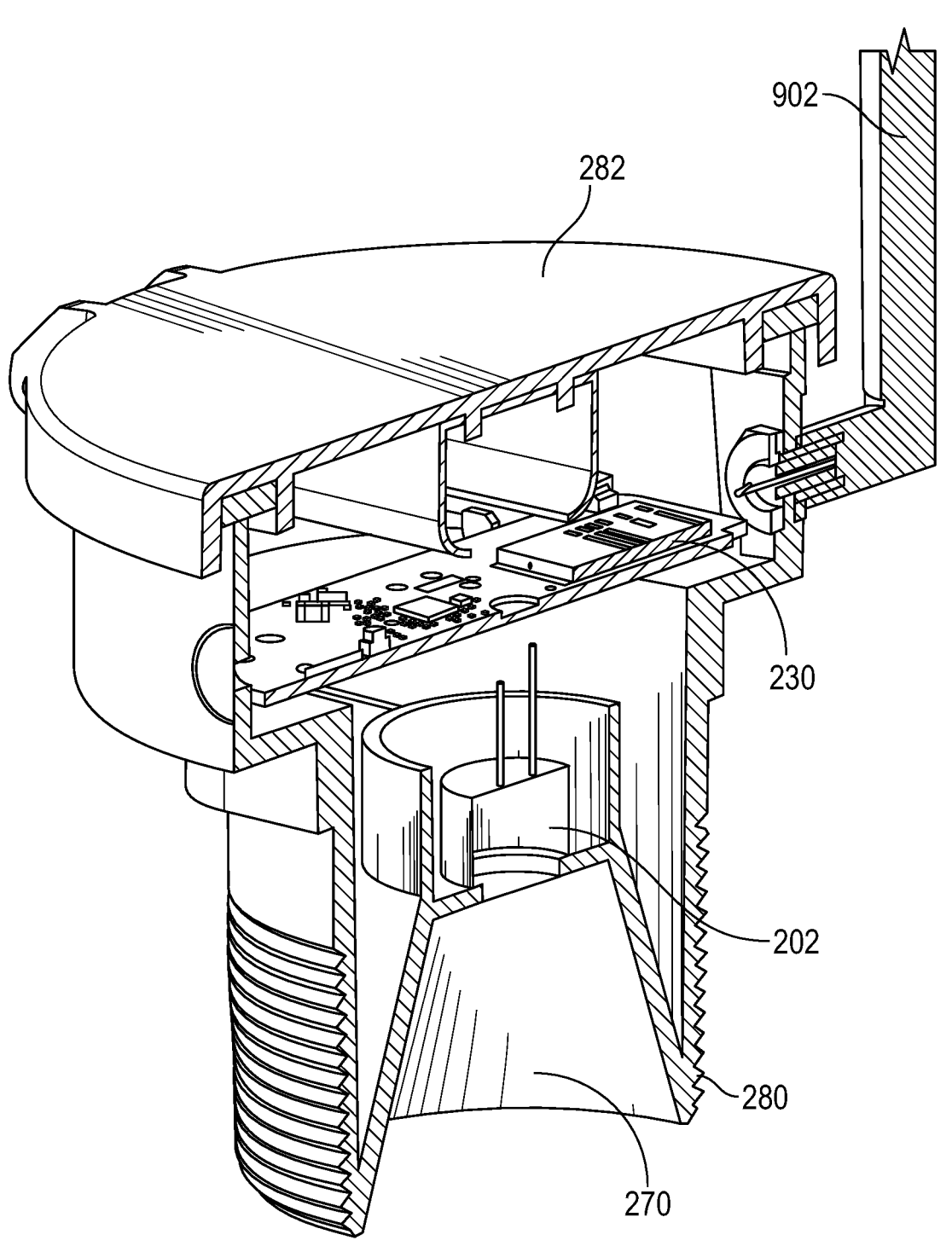
FIG. 9E is another partial cross-sectional perspective view of the embodiment of FIG. 9A.
Figures 10, 11:
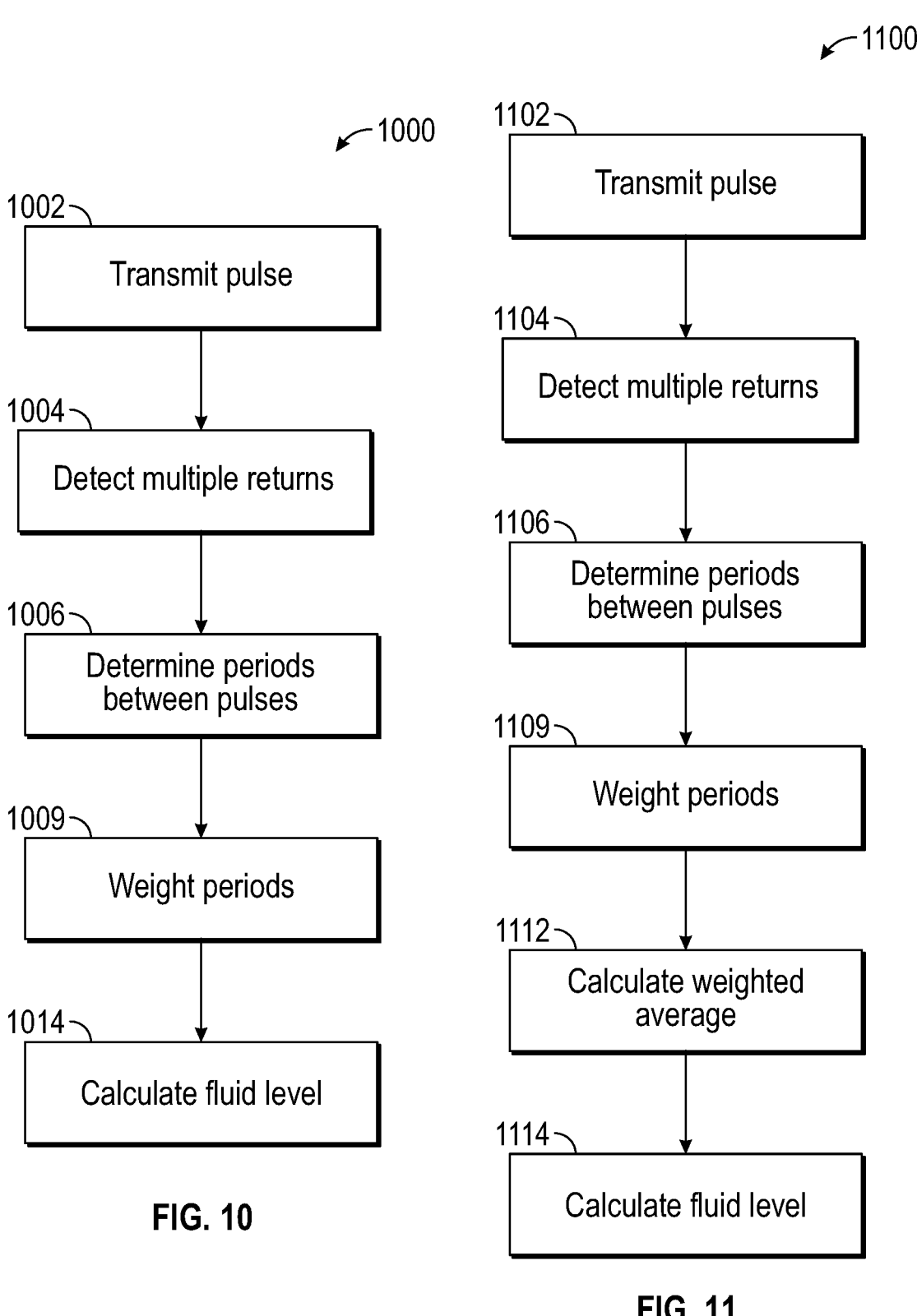
FIG. 10 is a flow chart of a method of a level sensor system according to the disclosure.
FIG. 11 is a flow chart of another method of a level sensor system according to the disclosure.
Figures 14, 15:
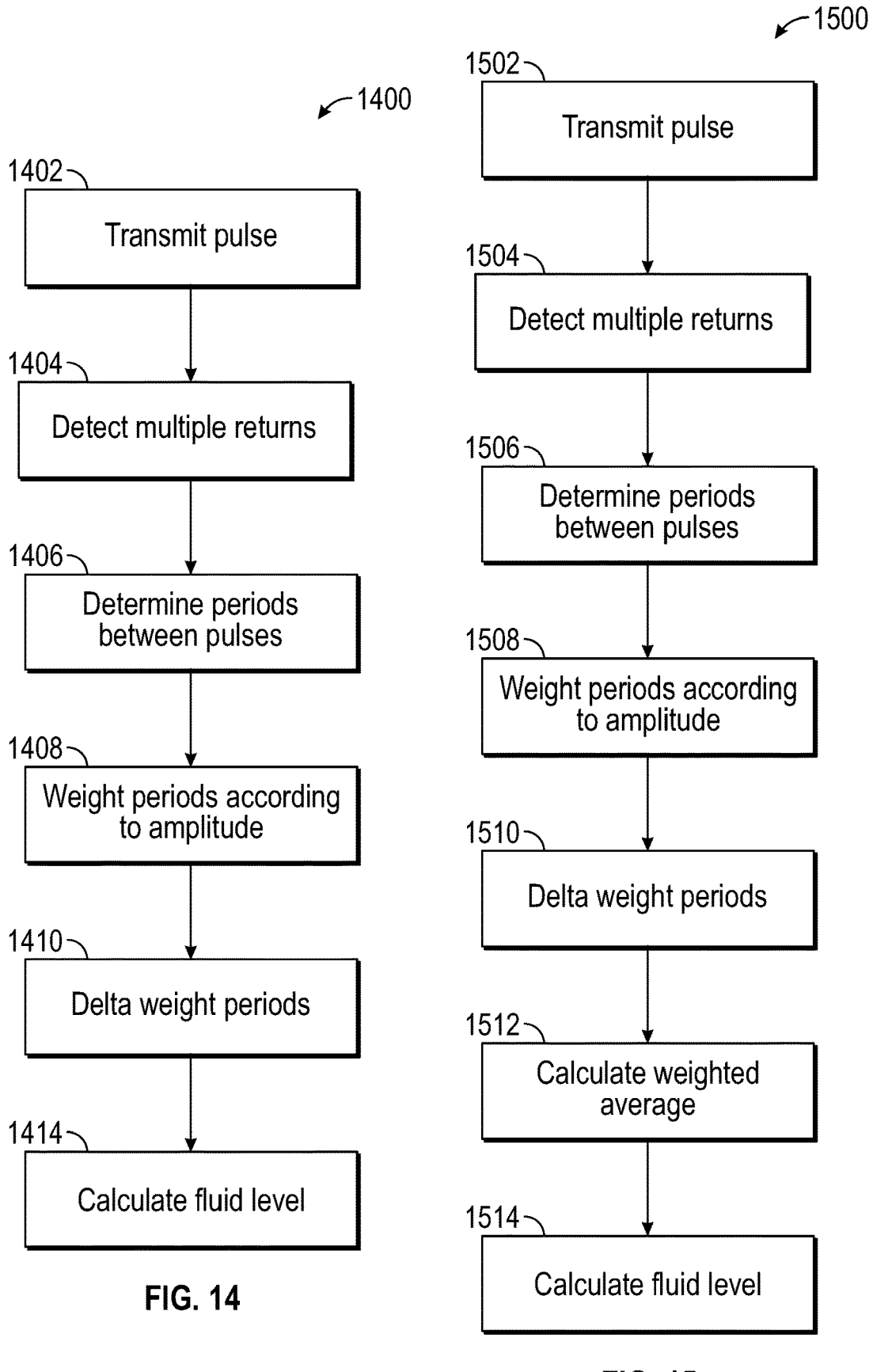
FIG. 14 is a flow chart of yet another method of a level sensor system according to the disclosure.
FIG. 15 is a flow chart of another method of a level sensor system according to the disclosure.
Figure 17:
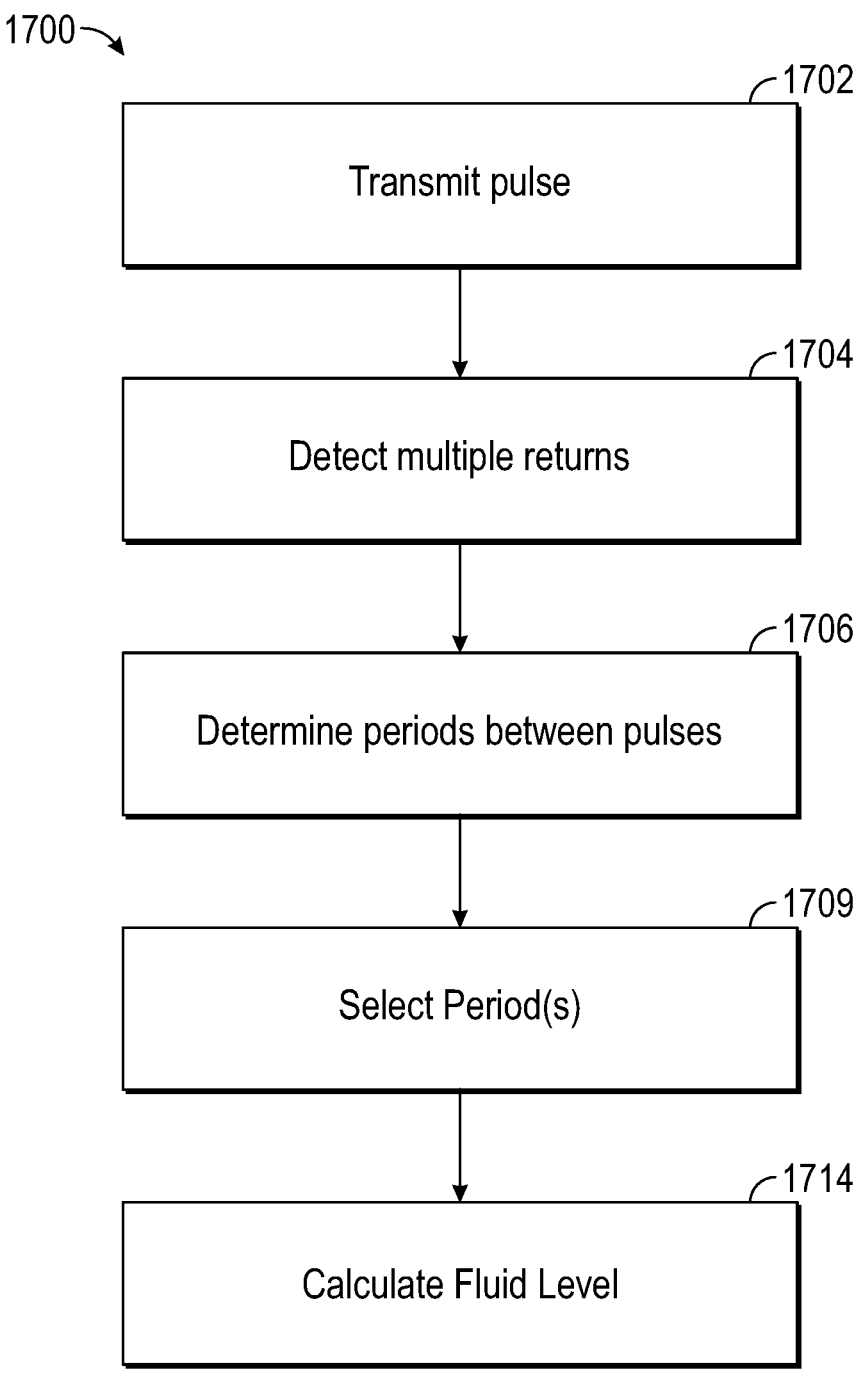
FIG. 17 is a flow chart of another method of a level sensor system according to the disclosure.

FIG. 1 is a schematic cross-sectional view of one of many embodiments of a level sensor system according to the disclosure. FIG. 2 is a schematic cross-sectional view of another of many embodiments of a level sensor system according to the disclosure. FIG. 3 is a schematic cross-sectional view of yet another of many embodiments of a level sensor system according to the disclosure. FIG. 4A is a schematic view of one of many embodiments of a level sensor system according to the disclosure. FIG. 4B is a perspective view of one of many embodiments of a level sensor system according to the disclosure. FIG. 5 is a schematic cross-sectional view of one of many embodiments of a level sensor system according to the disclosure. FIG. 6 is a schematic cross-sectional view of another of many embodiments of a level sensor system according to the disclosure. FIG. 7A is another schematic cross-sectional view of the embodiment of FIG. 6 according to the disclosure. FIG. 7B is yet another schematic cross-sectional view of the embodiment of FIG. 6 according to the disclosure. FIG. 8 is a schematic cross-sectional view of another of many embodiments of a level sensor system according to the disclosure. FIG. 9A is a perspective view of one of many embodiments of a level sensor system according to the disclosure. FIG. 9B is an exploded view of the embodiment of FIG. 9A. FIG. 9C is an exploded perspective view of the embodiment of FIG. 9A. FIG. 9D is a partial cross-sectional perspective view of the embodiment of FIG. 9A. FIG. 9E is another partial cross-sectional perspective view of the embodiment of FIG. 9A. FIG. 10 is a flow chart of a method of a level sensor system according to the disclosure. FIG. 11 is a flow chart of another method of a level sensor system according to the disclosure. FIG. 12 is a sample table produced in accordance with the disclosure, such as via one or more of the methods of FIG. 10, FIG. 11, FIG. 14, FIG. 15 and FIG. 17. FIG. 13 is another sample table produced in accordance with the disclosure, such as via one or more of the methods of FIG. 10, FIG. 11, FIG. 14, FIG. 15 and FIG. 17. FIG. 14 is a flow chart of yet another method of a level sensor system according to the disclosure. FIG. 15 is a flow chart of another method of a level sensor system according to the disclosure. FIG. 16 is a sample table produced in accordance with the disclosure, such as via one or more of the methods of FIG. 10, FIG. 11, FIG. 14, FIG. 15 and FIG. 17. FIG. 17 is a flow chart of another method of a level sensor system according to the disclosure. FIGS. 18-21 are sample tables produced in accordance with the disclosure, such as via one or more of the methods of FIG. 10, FIG. 11, FIG. 14, FIG. 15 and FIG. 17. FIGS. 1-21 will be described in conjunction with one another.

In at least one embodiment, a system 100 according to the disclosure can be configured to monitor the level, height or amount of liquid in a tank from the top of the tank (and/or one or more other locations) downwardly. In at least one embodiment, a system 100 according to the disclosure can be configured to monitor the level, height or amount of liquid in a tank from the bottom of the tank (and/or one or more other locations) upwardly. This monitoring can include without limitation at least one of measuring, obtaining, estimating, calculating, observing, reading, transmitting, receiving, displaying, gauging, evaluating, judging, determining and assessing one or more levels, heights and/or amounts of liquid in a tank, whether at one time, multiple times and/or over a period(s) of time, separately or in combination, in whole or in part. System 100 can include one or more sensors 200, which can be or include sensor arrangements and/or sensor systems, configured to be operatively coupled to one or more tanks 300 for monitoring the level, height or amount of liquid in the tank(s). In at least one embodiment, tank 300 can be or include a tank for holding, storing or otherwise containing water (e.g., potable water, gray water or black water), such as a tank made from plastic, metal or another material(s), separately or in combination, in whole or in part. Embodiments of the disclosure can be configured to monitor the level of other types of fluid or substances in a tank as well, such as LPG, fuel oil, gasoline, diesel or the like.

In at least one embodiment, sensor 200 can be or include an ultrasonic sensor configured to be directly or indirectly coupled to a wall 302 of a tank 300 and configured for directing ultrasonic waves through space (e.g., air space) in the tank. In at least one embodiment, the sensor 200 can be or include an ultrasonic sensor configured to be directly or indirectly coupled to a top wall 302 of a tank 300 and configured for directing ultrasonic waves downwardly (or in one or more downward or generally downward directions) through space (e.g., air space) in the tank between the bottom of the sensor and the top surface of liquid present in the tank. In at least one embodiment, the sensor 200 can be or include an ultrasonic sensor configured to be directly or indirectly coupled to a bottom wall 302 of a tank 300 and configured for directing ultrasonic waves upwardly (or in one or more upward or generally upward directions) through fluid in the tank between the top of the sensor and the top surface of liquid present in the tank. In at least one embodiment, the sensor 200 can be or include an ultrasonic sensor configured to be directly or indirectly coupled to a side wall 302 of a tank 300 and configured for directing ultrasonic waves horizontally or at an angle through the tank. As used herein, the term wall 302 can refer to a top wall, bottom wall, sidewall, or any other wall or surface of tank 300, depending on the embodiment in question and unless otherwise expressly limited. One or more sensors 200 can be coupled to tank 300 in any manner according to an implementation of the disclosure, which can but need not include the utilization of one or more couplers or couplants (e.g., fasteners, magnets, epoxy, glue, other adhesives).

In at least one embodiment, sensor 200 can include one or more piezo elements 202 acoustically coupled to wall 302. For example, one or more piezo elements 202 (and/or one or more other components of sensor 200) can be bonded to top wall 302, such as with an adhesive, and configured to sense liquid level in a top-down manner through top wall 302. In at least one embodiment, sensor 200 can be configured to vibrate at least a portion of wall 302, which can effectively utilize wall 302 itself as part of sensor 200. In other words, at least a portion of wall 302 can be or act as a vibrating membrane that generates and receives ultrasonic waves during sensor operations. Such an embodiment, which is but one of many, can be advantageous, for instance, because no hole in the tank is required that could potentially be or become a source for leakage. Further, since there are no portions of sensor 200 disposed inside the tank in such an embodiment, there is less concern about buildup of sewage or other contaminants on or near the sensor that could adversely affect system operation.

In at least one embodiment, one or more tanks 300 can include a wall 302 with a section or portion advantageously arranged for cooperating with one or more sensors 200. For example, at least a portion of wall 302 can be thinner (see, e.g., FIG. 1) than the surrounding tank wall or body material, which in at least one embodiment can at least partially facilitate or otherwise support proper or desired functionality or operation of sensor 200 (e.g., by supporting measurement communication between sensor 200 and liquid residing in a tank 300). Whether such a thinned portion of wall 302 is incorporated into an implementation of the disclosure can depend, for example, on variables such as the material type and wall thickness of a tank 300. In at least one embodiment, which is but one of many exemplary implementations of system 100, sensor 200 can be operatively coupled to a portion of a tank body (e.g., a plastic or other tank body) having a thickness of less than or equal to 2.6 mm or at least about 2.6 mm, or as another example, having a thickness of less than or equal to 5.6 mm (or thicker) or at least about 5.6 mm (or thicker). In at least one embodiment, at least a portion of wall 302 can be configured to operatively couple with and/or communicate with sensor 200 or a portion thereof, such as a piezo element, which can include a portion of wall 302 configured to vibrate in a drum skin like manner during sensor operations.

A sensor 200 according to the disclosure can utilize onboard and/or external power as needed or desired according to an implementation of the disclosure. For example, sensor 200 can include or be coupled to one or more batteries. As another example, sensor 200 can be configured to utilize the battery or other electrical power system of a vehicle such as an RV. In at least one embodiment, system 100 or a component thereof, such as sensor 200, can include a voltage monitoring system, which can be or include a voltage monitoring system that replaces all or a portion of the battery monitoring system of an RV or other vehicle.

In at least one implementation of system 100, the natural frequency of the entire membrane system, with bonded piezo element, is not necessarily equal to the typical natural frequency of the individual components. Likewise, the resulting frequency of the system can be difficult to determine by equation. Accordingly, in at least one embodiment, sensor 200 can be configured to drive one or more piezo elements at one or more unique frequencies determined during development of an embodiment of sensor 200 for a particular tank or tank design with which such embodiment will be utilized, which can be or include any tank or tank design according to an implementation of the disclosure. For instance, one or more unique frequencies can be determined and/or implemented during the manufacturing process for one or more sensors. As another example, in at least one embodiment, system 100 can include a swept frequency drive configured to find or identify one or more optimal or available operational frequencies for an implementation of the disclosure.

In at least one embodiment, sensor 200 can include a housing 220 to house and protect the piezo element(s) 202 and control circuitry 230. The control circuitry 230 can include a printed circuit board and/or a microprocessor. In at least one embodiment, sensor housing 220 can be or include a cap or plug configured to be coupled to an opening in the top of a tank 300 (see, e.g., FIG. 2), such as by way of threads, press fit, adhesive or otherwise. Such an embodiment, which is but one of many, can be beneficial in at least some implementations, such as for ease of tank manufacturing and installation of the sensor since a single hole can be cut in the tank and then plugged by sensor 200. Once again, sensor 200 can be mounted to the wall of tank 300 with epoxy, glue, by ultrasonic welding or via any other type of adhesive or temporary or permanent manner of coupling needed or desired according to an implementation of the disclosure. In at least one embodiment, the sensor 200 and/or housing 220 can include one or more flanges 250 to assist in securing the sensor 200 and/or housing 220 to the tank 300. Flange 250 can but need not be integral, in whole or in part, and can be continuous or segmented. In at least one embodiment, the bottom of housing 220 can be closed (see, e.g., FIGS. 2 and 7A) and a piezo can be disposed in acoustic communication with a bottom surface or wall of housing 220. In at least one embodiment, the bottom of housing 220 can be at least partially open (see, e.g., FIGS. 3, 8 and 9A) and a piezo can be disposed in acoustic communication with an air gap or other space between sensor 200 and liquid residing in tank 300.

In at least one embodiment, sensor 200 can include a piezo element coated with one or more closed pore materials. In such an embodiment, which is but one of many, the closed pore material can replace the membrane wall, such that the ultrasonic waves are generated thru the porous material. In at least one embodiment, this can preclude any need for bonding a piezo element to an adjacent or underlying surface or wall, such as the wall of the cap or plug (if present). In at least one embodiment, all or a portion of the interior of housing 220 can be filled with protective media, such as epoxy or another encapsulant, for protecting one or more components of sensor 200 from the external environment.

As will be appreciated by a person of ordinary skill in the art having the benefits of the present disclosure, sensor 200 can function on the principle that its ultrasonic waves will travel through the air or other space in tank 300 and reflect off of the liquid level. The return echo will then be received by the sensor and the time of flight can be used to measure the air space in the tank. By subtracting the air space from the total tank height, the liquid level or height can be obtained and, if desired, utilized to calculate other variables such as area or volume.

As will also be appreciated by a person of ordinary skill in the art having the benefits of the present disclosure, sensor 200 can function on the principle that its ultrasonic waves will travel through the fluid in tank 300 and reflect off of the fluid/air interface. The return echo will then be received by the sensor and the time of flight can be used to measure the liquid level or height and, if desired, utilized to calculate other variables such as area or volume.

In at least one embodiment, system 100 can include communications link 400 between the sensor 200 and a controller, or interface, 450. The communications link 400 can be wired or wireless as disclosed herein. Where the communications link 400 is wired, as shown in FIGS. 4B and 7B for example, the communications link 400 can also supply power to the sensor 200. The controller 450 can be used by an operator to control and/or interface with the system 100. For example, the operator can press a button on the interface 450 to cause the system 100 to determine that tank level and display that level on the interface 450.

In at least one embodiment, the communications link 400 of the system 100 or a component thereof, such as sensor 200, can include circuitry for sending sensor signals via Bluetooth, Wi-Fi or any other wireless communication method to one or more other components of system 100. In at least one embodiment, such information or data can be sent to a smart phone, computer, dedicated receiver or another device for receiving, displaying, relaying, processing or otherwise utilizing the information or data. In at least one embodiment, system 100 or a component thereof, such as sensor 200, can be configured to communicate sensor data to one or more new or pre-existing displays and/or control panels mounted in an RV or other location. In at least one embodiment, system 100 or a component thereof, such as sensor 200, can include circuitry for sending sensor signals via one or more wired communication means to one or more other components of system 100. In at least one embodiment, system 100 or a component thereof, such as sensor 200, can include circuitry for outputting pure voltage or analog outputs representing liquid or tank level or, as another example, circuitry for digital communications using controller area network (CAN), LIN bus, serial or UART communications, etc.

In at least one embodiment, system 100 or a component thereof, such as sensor 200, advantageously can be configured for operation with one or more components or aspects of a conventional tank monitoring system, such as, for example, a conventional "probe" system on an RV as mentioned elsewhere in the present disclosure. For example, at least some conventional probe systems used for clean, gray and black water tanks in RVs can rely on the principle that the individual probes are wired in series and form a different resistance based on the number of probes exposed to the water. As each probe is exposed to the water, it shorts across that resistance in the chain, thereby reducing the total resistance. A "remote" device is typically used to read these probes and the "remote" device typically also has a resistance on its output, thus forming a resistive voltage divider where the resulting voltage can be read by the "remote" device to determine the water level. In at least one embodiment, system 100 or a component thereof, such as sensor 200, can include circuitry configured to emulate such conventional systems by using a similar resistive divider behavior in order to be compatible with conventional "remote" devices and other systems capable of reading those types of probes. For example, in at least one embodiment, system 100 can include a circuit to simulate resistance or to drive a simulated voltage, which can make system 100 compatible with existing "remotes" intended to work for the conventional "probe" systems. In this manner, in at least one embodiment, system 100 can be or include a "drop-in" or otherwise readily available replacement for one or more components of the conventional probe-based systems.

As another example, due to the passive and resistive nature of the conventional probe-based systems, there is typically no need to provide a wire for battery power to the probes, which almost all electrical sensors would otherwise require. However, in many of the conventional probe-based systems, the "remote" device that is reading the probes will provide the battery voltage indirectly on one wire through a relatively high resistance, thereby forming the voltage divider as described above. This indirect path to battery power can provide a relatively minute amount of current or power. In order to facilitate compatibility with one or more conventional probe-based systems, or to simply avoid the need for an extra battery power wire, in at least one embodiment system 100 can include one or more "energy harvesting" circuits configured to extract the relatively small amount of power provided through a conventional "remote" device's resistive reader circuit described above. For example, system 100 can include one or more controllers, which can be or include one or more microprocessors, and software can be implemented such that one or more sensors 200 stay "asleep" in a low power mode until enough power has been harvested to wake up, measure the fluid level and transmit the measurement to a receiver before going back to sleep.

In at least one embodiment, system 100 or a component thereof, such as sensor 200, can include one or more accelerometers for measuring or assessing the levelness or incline of one or more of sensor 200, tank 300, a structure to which they are coupled (e.g., an RV) and a combination thereof. One or more accelerometers can be used to provide an indication to a sensor microprocessor or other system controller, such as in the event that the tank is not mounted level or, as another example, if an RV comprising the tank is on an incline or decline. In such cases, system 100 can be configured to decide not to take one or more ultrasonic level measurements until the sensor and/or tank are level again. For example, this can be necessary or desirable in one or more embodiments of system 100 comprising an ultrasonic transducer having a directional beam pattern. In other words, when sensor 200 or tank 300 is not level, the reflection of the ultrasound off of the liquid in tank 300 can reflect back at an offset angle and provide a weak or no return signal to sensor 200. Accordingly, in at least one embodiment, system 100 can include an accelerometer and can be configured for utilizing a levelness assessment for determining whether one or more tank level measurements is or might be invalid and/or whether to ignore or disregard one or more of such measurements.

As mentioned elsewhere in this disclosure, in at least one embodiment, the sensor 200 can be mounted in a hole in a wall 302, such as a top wall, a bottom wall, and/or a side wall, of the tank 300. In at least one embodiment, as shown in FIG. 5 for example, a portion of the housing 220 of the sensor 200 can extend into the tank 300, beyond an inner surface 310 of the wall 302. Where the wall 302 is a top wall 302, the portion of the housing 220 of the sensor 200 can extend below an inner surface 310 of the top wall 302. In at least one embodiment, the piezo element 202 can likewise extend into the tank 300, beyond an inner surface 310 of the wall 302. For example, where the wall 302 is a top wall 302, the piezo element 202 can likewise extend below an inner surface 310 of the top wall 302. In at least one embodiment, such as that shown in FIG. 1, the piezo element 202 can be positioned outside the tank 300, either completely beyond the wall 302 or within the wall 302. In either case, there can be an offset 500 between the housing 220 and/or piezo element 202 and the inner surface 310 of the wall 302.

As mentioned elsewhere in this disclosure, in at least one embodiment, the sensor 200 can be configured to transmit one or more acoustic pulses from the wall 302 of the tank 300 for measuring a distance between a liquid/air interface 350 (e.g., the fluid level in the tank 300) and the transducer. As also mentioned elsewhere in this disclosure, in at least one embodiment, the sensor 200 can be configured to utilize the wall 302 of the tank 300 in transmitting and/or receiving, or detecting, pulses reflected by the liquid/air interface 350. One can appreciate having read the instant disclosure, where there is an offset 500 between the housing 220 and/or piezo element 202 and the inner surface 310 of the wall 302, there can be different periods between pulses reflected directly between the piezo element 202 and the liquid/air interface 350 when compared with pulses reflected between the inner surface 310 of the wall 302 and the liquid/air interface 350. The control circuitry 230 can be configured to detect and distinguish between the pulses reflected directly between the piezo element 202 and the liquid/air interface 350 and the pulses reflected between the inner surface 310 of the wall 302 and the liquid/air interface 350. The control circuitry 230 can be configured to calculate the offset 500 between the housing 220 and/or piezo element 202 and the inner surface 310 of the wall 302 by determining the different periods associated with the pulses reflected directly between the piezo element 202 and the liquid/air interface 350 and the pulses reflected between the inner surface 310 of the wall 302 and the liquid/air interface 350. In this manner, the control circuitry 230 can be configured to account for the offset 500 in subsequent determinations of the level 350 in the tank 300.

In at least one embodiment, as shown in FIGS. 6, 7A and 7B, for example, the housing 220 and/or piezo element 202 can be mounted flush with the inner surface 310 of the wall 302, thereby eliminating any offset 500 between the housing 220 and/or piezo element 202 and the inner surface 310 of the wall 302. Such a configuration can eliminate any differences between the pulses reflected directly between the piezo element 202 and the liquid/air interface 350 and the pulses reflected between the inner surface 310 of the wall 302 and the liquid/air interface 350. Such a configuration can also eliminate any errors induced by attempting to account for the offset 500 in determinations of the level 350 in the tank 300.

In at least one embodiment, as best shown in FIGS. 8, 9A, 9D and 9E, the housing 220 of the sensor 200 can include an inner surface 270 configured to focus or collect pulses returned from the fluid/air interface 350. In at least one embodiment, at least a portion of the inner surface 270 of the sensor housing 220 can be conically shaped. In at least one embodiment, the inner surface 270 of the sensor housing 220 can be elliptically shaped. In at least one embodiment, the inner surface 270 of the sensor housing 220 can be arcuately shaped, spherically shaped or otherwise angled or curved for directing pulses or reflections toward piezo element 202. In at least one embodiment, as shown in FIGS. 6, 7A and 7B, for example, the inner surface 270 of the sensor housing 220 can be flat, which can provide a more uniform surface for detecting pulses returned from the fluid/air interface 350.

In at least one embodiment, the housing 220 of the sensor 200 can include threads 280, thereby allowing the housing 220 to be threaded into the wall 302 of the tank 300. In at least one embodiment, the housing 220 of the sensor 200 can include a lid 282, such as a cap or other cover, to protect the control circuitry 230 and/or piezo element 202 from the environment. In at least one embodiment, the housing 220 can include a seal 284, such as an O-ring or a gasket, to further seal the lid 282 to the body of the housing 220. In at least one embodiment, the housing 220 can include a latch 286, such as a threaded fastener assembly, to secure the lid 282 to the body of the housing 220. In at least one embodiment, the housing 220 can include a hinge 288 to rotateably attach the lid 282 to the body of the housing 220, thereby selectively permitting both access to and protection of the control circuitry 230 and/or piezo element 202.

In at least one embodiment, such as where the communications link 400 is wireless, the sensor 200 can include an antenna 902 for communicating with the interface 450. In at least one embodiment, the control circuitry 230 can include a radio frequency (RF) transceiver for communicating over Bluetooth, Wi-Fi, cellular, or any other wireless communication method. The antenna 902 can be releasably coupled to the control circuitry 230 through an RF connector 904. In at least one embodiment, such as where the communications link 400 is wireless, the sensor 200 can include a battery pack 950 for supplying power to the control circuitry 230.

Turning now to FIG. 10, a method 1000 of measuring a level 350 of a fluid in a tank 300 can begin by transmitting an energy pulse from an emitter, or transducer, mounted to a wall 302 of the tank 300, as shown in step 1002. The emitter, or transducer, can be or include one or more piezo elements 202 discussed above. The energy pulse can be transmitted downwardly, upwardly, horizontally, or at an angle, depending on to which wall 302 the sensor 200 is mounted, and the angle at which the sensor 200 is mounted. For example, where the piezo element 202 is mounted to a top wall 302, the energy pulse can be transmitted downwardly. In at least one embodiment, where the piezo element 202 is mounted to a bottom wall 302, the energy pulse can be transmitted upwardly.

As shown in step 1004, the method 1000 can continue by detecting a plurality of return, or reflected, pulses at a detector, or transducer, mounted to the wall 302 of the tank 300. In at least one embodiment, each return, or reflected pulse is a different reflection of the energy pulse transmitted in step 1002. For example, as shown in FIG. 5 and FIG. 6, one energy pulse transmitted from the emitter, such as the piezo element 202 can bounce back and forth between the wall 302 of the tank 300 and the fluid/air interface 350, and therefore be detected as the plurality of return pulses from the one transmitted energy pulse.

The emitter and detector can be integral to the transducer, such as the piezo element 202. In at least one embodiment, the emitter and detector are separate elements. For example, the emitter and detector can be separate piezo elements 202, with one piezo element 202 being used to transmit the energy pulse and a different piezo element 202 being used to detect the return pulses. In at least one embodiment, the sensor 200 includes multiple piezo elements 202. In at least one embodiment, the system includes multiple sensors 200.

In at least one embodiment, the energy pulse can be transmitted from, and each of the plurality of return pulses detected at, the sensor housing 220. In at least one embodiment, the energy pulse can be transmitted from one sensor housing 220, and each of the plurality of return pulses detected at, another sensor housing 220. In at least one embodiment, the energy pulse can be transmitted from the sensor housing 220, and each of the plurality of return pulses detected at, the wall 302 of the tank 300. In at least one embodiment, the energy pulse can be transmitted from a first sensor housing 220, and some of the plurality of return pulses detected at the first sensor housing and some of the return pulses detected at a second sensor housing 220. In at least one embodiment, the energy pulse can be transmitted from a sensor housing 220, and some of the plurality of return pulses detected at the sensor housing 220 and some of the return pulses detected at the wall 302 of the tank 300. In at least one embodiment, the energy pulse can be transmitted from a first sensor housing 220, and some of the plurality of return pulses detected at the first sensor housing 220, some of the return pulses detected at a second sensor housing 220 and some of the return pulses detected at the wall 302 of the tank 300.

As shown in step 1006, the method 1000 can continue by calculating, timing, or otherwise determining a plurality of periods between the pulses. In at least one embodiment, step 1006 can include the control circuitry 230 subtracting a first time at which a first pulse occurs from a second time at which a second pulse occurs. In at least one embodiment, step 1006 can include the control circuitry 230 determining a first period between the transmitted energy pulse and a first return pulse. In at least one embodiment, step 1006 can include the control circuitry 230 associating each period with a time at which the adjacent pulses were received. For example, where the transmitted energy pulse is triggered at time 0us and a first return pulse is detected at 200 μs, a first period can be determined to be 200 μs and can be associated with either time, i.e., 0 μs or 200 μs. Continuing this example, where a second return pulse is detected at 390 μs, a second period can be determined as 190 μs (390 μs-200 μs) and associated with either 200 μs or 390 μs. In at least one embodiment, step 1006 can include the control circuitry 230 associating each period with a time at which the latter adjacent pulse was received, such that the 200 μs first period would be associated with the first pulse detected at 200 μs and the 190 μs second period would be associated with 390 μs in the preceding example.

As shown in step 1009, the method 1000 can continue by scoring, or weighting, at least two of the periods. In at least one embodiment, step 1009 can include the control circuitry 230 scoring, or weighting, at least ten periods. In at least one embodiment, step 1009 can include scoring, or weighting, at least thirty periods. In at least one embodiment, step 1009 can include the control circuitry 230 scoring, or weighting, up to thirty periods. In at least one embodiment, step 1009 can include the control circuitry 230 scoring, or weighting, up to fifty periods. In at least one embodiment, step 1009 can include the control circuitry 230 scoring, or weighting, up to one hundred periods. In at least one embodiment, step 1009 can include the control circuitry 230 scoring, or weighting, up to two hundred periods.

Referring also to FIG. 12, an example is provided with sample, fictitious data. For purposes of the example provided in FIG. 12, fictitious pulses are presumed to have been detected at the times shown in the left-hand column labelled "Pulses," i.e., 0 μs, 190 μs, 390 μs, 600 μs, etc., with the 0 μs pulse being associated with the transmitted energy pulse and the subsequent pulses being reflected from the liquid/air interface 350. For purposes of the example provided in FIG. 12, the column labelled "ΔT" represents the plurality of periods between the pulses. As shown in the example provided in FIG. 12, fictitious periods of 180 μs, 190 μs, 200 μs, 210 μs, and 220 μs, were determined, given the fictitious pulses of the example. As shown in the example provided in FIG. 12, these periods are associated with the latter of their adjacent pulses, such that the first period is 190 μs and is associated with 190 μs, the second period is 200 μs and is associated with 390 μs, the third period is 210 μs and associated with 600 μs, etc.

It is to be understood, having read the instant disclosure, different periods between pulses can be experienced in real world examples of the invention due to the environment in which the invention is operated, such as different densities in the fluid in the tank 300, accuracy of the components of the system 100, and/or other factors. One advantage of the invention is the use of economical components in providing reliable level determinations in real world conditions.

For purposes of the example provided in FIG. 12, the column labelled "Wght" represents different weights associated with each period. Weighing, or scoring, each period can be done in a number of ways. In at least one embodiment, each antecedent, or preceding, period is scored higher than all subsequent periods, which would have the effect that each antecedent period is more influential than the subsequent periods in determining the level 350 in the tank, as will be discussed in further detail below. For example, in at least one embodiment, the first period is weighted 1.000, and the weight associated with each subsequent pulse is decremented by 0.001, as shown in FIG. 12.

In at least one embodiment, each period is weighted, or scored, according to the amplitude of its defining pulse(s). One would expect, having read the instant disclosure, that subsequent pulses would have lower amplitudes than antecedent pulses due to attenuation losses passing through the space in the tan and being reflected, or refracted, within the tank. Thus, weighting, or scoring each period according to the amplitude of its defining pulse(s) could produce the weighting reflected in the example of FIG. 12, or something similar. Any of the methods of the present invention, such as methods 1000, 1100, 1400, 1500 and 1700, can use this amplitude/attenuation scoring and/or the decrement scoring discussed above, either alone or in combination with other scoring, weighting methodologies.

In at least one embodiment, each antecedent, or preceding, period is scored lower than all subsequent periods, which would have the effect that each antecedent period is less influential than the subsequent periods in determining the level 350 in the tank, as will be discussed in further detail below. In at least one embodiment, periods can be ignored when the amplitude of its defining pulse(s) drops below a noise threshold. In at least one embodiment, periods can be ignored when adequate periods are determined. For example, in at least one embodiment, once thirty periods are determined after the transmitted energy pulse, subsequent reflected pulses, and thus periods, can be ignored.

In the table on the right-hand side of FIG. 12, a tabular histogram is constructed, tabulating the different weights associated with the different fictitious periods of the example provided in FIG. 12. For purposes of the example provided in FIG. 12, the period of 180 μs occurred once and was assigned a total weight, or score, of 0.997. For purposes of the example provided in FIG. 12, the period of 190 μs occurred eight times and was assigned a total weight, or score, of 7.867, which is the summation of the weights associated with each occurrence of the 190 μs period in the fictitious example provided in FIG. 12. For purposes of the example provided in FIG. 12, the period of 200 μs occurred twelve times and was assigned a total weight, or score, of 11.829. For purposes of the example provided in FIG. 12, the period of 210 μs occurred eight times and was assigned a total weight, or score, of 7.889. For purposes of the example provided in FIG. 12, the period of 220 μs occurred once and was assigned a total weight, or score, of 0.983.

As shown in step 1014, the method 1000 can continue by determining a distance between the level of the fluid and the wall of the tank according to the scoring utilizing at least two of the periods. Given the fictitious example of FIG. 12, the period of 200 μs occurred more than any of the other periods and was assigned the highest total weight. Therefore, in at least one embodiment, the control circuitry 230 of the present invention would select the period of 200 μs as the most likely period from which to calculate the distance between the level of the fluid and the wall of the tank and/or the sensor 200. In at least one embodiment, step 1014 of the method 1000 can include the control circuitry 230 multiplying the speed of sound by this selected period (200 μs in the example of FIG. 12) and then dividing by two to determine the distance between the level of the fluid and the wall 302 and/or the sensor 200.

Assuming that the sensor 200 is mounted to a top wall 302 of the tank 300 at sea level and shooting through the air in the tank at 25 degrees Celsius, such that the speed of sound is 1,122.96 feet per second, in step 1014 of the method 1000, the control circuitry 230 would determine the distance to be 0.112296 feet, or 1.347552 inches, using the following formula.

$$\frac{C\,(\text{speed of sound}) \times \text{Selected Period}}{2}$$

$$\frac{1122.96\,(\text{speed of sound in ft/s}) \times 0.0002\,(\text{period in seconds})}{2}$$

$$0.224592/2 = 0.112296$$

The method 1000 can continue by providing a signal indicative of the level in the tank. In at least one embodiment, where the sensor is mounted to a top wall 302 of the tank 300, the signal indicative of the level in the tank would be inversely proportional to the distance between the level of the fluid and the top wall 302 and/or the sensor 200. The exact formula for determining the level 350 from the distance between the level of the fluid and the top wall 302 and/or the sensor 200, in this case, would depend on the dimensions of the tank. Given an example tank having a one foot, or twelve inches, depth and the preceding example, the method 1000 can continue by the control circuitry 230 providing a signal indicating that the level 350 in the tank 300 is 10.652 inches (12 inches–1.348 inches). One having read the instant disclosure would readily understand that as the level 350 in the tank 300 goes down, the distance determined would increase, assuming that the sensor 200 is mounted to a top wall 302 of the tank 300.

In at least one embodiment, where the sensor is mounted to a bottom wall 302 of the tank 300, the signal indicative of the level in the tank would be directly proportional to, and can actually match, the distance between the level of the fluid and the top wall 302 and/or the sensor 200. For example, assuming that the sensor 200 is mounted to a bottom wall 302 of the tank 300 at sea level and shooting through fresh water in the tank at 25 degrees Celsius, such that the speed of sound is 4,940.1 feet per second, in step 1014 of the method 1000, the control circuitry 230 would determine the distance to be 0.49401 feet, or 5.92812 inches. Given this example, the method 1000 can continue by the control circuitry 230 providing a signal indicating that the level 350 in the tank 300 is 5.928 inches.

It can be understood that the speed of sound is different, when travelling through different media, with different densities, at different temperatures, and/or at different pressures, such as that experienced at different altitudes. Thus, the speed of sound through any given media can be calculated by the control circuitry 230 or can be retrieved from a look-up table accessible to the control circuitry 230. In at least one embodiment, the sensor 200 includes environmental sensors, such as a temperature sensor and/or a pressure sensor, that can be used to calculate or select the appropriate speed of sound for a given instance. For example, in at least one embodiment, the control circuitry 230 is able to utilize a first speed of sound during the warm summer months and a second speed of sound during the colder winter months. In at least one embodiment, the control circuitry 230 is able to utilize a first speed of sound at low altitude near sea level and a second speed of sound during at higher altitudes in the mountains for example. In at least one embodiment, utilizing bottom-up sensors 200, an RV can utilize different speed of sound values for each tank 300, i.e., a freshwater tank can utilize a first speed of sound value, a black water tank can utilize a second speed of sound value, and a grey water tank can utilize a third speed of sound value somewhere between the first and second values.

Comparing FIG. 10 to FIG. 11, one can see that method 1100, as shown in FIG. 11, can be similar to method 1000, as shown in FIG. 10. For example, step 1102 of method 1100, as shown in FIG. 11, can be similar to step 1002 of method 1000, as shown in FIG. 10, and in at least one embodiment, step 1102 is identical to step 1002. Thus, as shown in FIG. 11, a method 1100 of measuring a level 350 of a fluid in a tank 300 can begin by the sensor 200 transmitting an energy pulse from an emitter, or transducer, mounted to a wall 302 of the tank 300, as shown in step 1102. For further explanation of step 1102, the reader is directed to the description of step 1002.

Similarly, step 1104 of method 1100, as shown in FIG. 11, can be similar to step 1004 of method 1000, as shown in FIG. 10, and in at least one embodiment, step 1104 is identical to step 1004. Thus, as shown in in step 1104 of FIG. 11, the method 1100 can continue by the sensor 200 detecting a plurality of return, or reflected, pulses at a detector, or transducer, mounted to the wall 302 of the tank 300. For further explanation of step 1104, the reader is directed to the description of step 1004.

Likewise, step 1106 of method 1100, as shown in FIG. 11, can be similar to step 1006 of method 1000, as shown in FIG. 10, and in at least one embodiment, step 1106 is identical to step 1006. Thus, as shown in step 1106 of FIG. 11, the method 1100 can continue by the control circuitry 230 of the sensor 200 calculating, timing, or otherwise determining a plurality of periods between the pulses. For further explanation of step 1106, the reader is directed to the description of step 1006.

Step 1109 of method 1100, as shown in FIG. 11, can also be similar to step 1009 of method 1000, as shown in FIG. 10, and in at least one embodiment, step 1109 is identical to step 1009. Thus, as shown in step 1109 of FIG. 11, the method 1100 can continue by the control circuitry 230 of the sensor 200 scoring, or weighting, at least two of the periods.

The scoring, or weighting, of the periods, as shown in method 1000 and/or method 1100, can be done with according to attenuation or by decrementing the weight of subsequent period, as described in relation to FIG. 12. One difference between method 1000 and method 1100 is that method 1100 includes calculating a weighted average of at least some of the periods, as shown in step 1112.

As shown in the tabular histogram on the right-hand side of FIG. 12, the period of 180 μs was assigned a total weight, or score, of 0.997, the period of 190 μs was assigned a total weight, or score, of 7.867, the period of 200 μs was assigned a total weight, or score, of 11.829, the period of 210 μs was assigned a total weight, or score, of 7.889, the period of 220 μs was assigned a total weight, or score, of 0.983, in the example provided in FIG. 12. Thus, in the example provided in FIG. 12, 200 μs was selected as the period most likely to reflect the true time-of-flight of the energy pulse between the sensor 200 and the fluid level 350.

It can be seen in the example provided in FIG. 12, only periods of 180 μs, 190 μs, 200 μs, 210 μs, and 220 μs were determined. Thus, given the data in FIG. 12, only discrete levels would be calculated, or determined. One having read the instant disclosure would recognize the true level 350 in the tank 300 might lay between these discrete levels. Depending on the precision of the components of the sensor 200, however, the sensor 200 may not be able to detect the return pulses, or echoes, with finer precision. For example, in at least one embodiment, the sensor 200 can detect the return pulses, or echoes, with a 1 μs resolution. In at least one embodiment, the sensor 200 can detect the return pulses, or echoes, with a 5 μs resolution. In at least one embodiment, the sensor 200 can detect the return pulses, or echoes, with a 10 μs resolution, as reflected in the example of FIG. 12. In at least one embodiment, the sensor 200 can detect the return pulses, or echoes, with a 20 μs resolution. One can decide to use components for the sensor 200 which limit the detectable resolution for a variety of reasons, such as cost, power consumption, etc.

In any case, in at least one embodiment, the present invention can provide accurate level measurements using lower cost and/or lower power consumption components.

For example, by calculating a weighted average of at least some of the periods, as shown in step 1112, at least one embodiment of the present invention can calculate the level 350 in the tank 300 at a higher precision than the components of the sensor 200 are otherwise able to provide.

With 200 μs being selected as the period most likely to reflect the true time-of-flight of the energy pulse between the sensor 200 and the fluid level 350, as reflected in FIG. 12, the control circuitry 230 can calculate a weighted average of the selected period and adjacent periods. In at least one embodiment, the weighted average is calculated using t (the selected period), t–1 (next lower period) and t+1 (the next higher period). In the example provided in FIG. 12, the weighted average is calculated as 200.008 μs, using t–1 (190 μs), t (200 μs) and t+1 (210 μs). Thus, a higher precision time-of-flight of the energy pulse between the sensor 200 and the fluid level 350, and thus the level 350 of the tank, can be calculated than the components of the sensor 200 are otherwise able to provide.

In at least one embodiment, the weighted average is calculated using t–2, t–1, t, t+1, and t+2. Other determined periods can be ignored for purposes of calculating the weighted average. In at least one embodiment, however, all determined periods can be used in calculating the weighted average. Of course, in at least one embodiment, such as the method 1000, calculating the weighted average is not necessarily required to provide adequate level determinations.

Referring also to FIG. 13, another example of scoring, or weighting, is provided with sample, fictitious data. Comparing FIG. 13 to FIG. 12, one can see similarities. For example, the same fictitious pulses, timing, and periods are reflected in both figures. However, FIG. 13 utilizes delta weighting, where the score, or weight, for each period is calculated as the period divided by the time the associated pulse was received. At least because the periods are roughly of similar scales and the times continue to increase as subsequent pulses are detected, this delta weighting results in each antecedent, or preceding, period being scored higher than all subsequent periods, which would have the effect that each antecedent period is more influential than the subsequent periods in determining the level 350 in the tank. Any of the methods of the present invention, such as methods 1000, 1100, 1400, 1500, and 1700, can use this delta weighting, either alone or in combination with other scoring, weighting methodologies.

FIG. 13 also shows an example of Finite Impulse Response (FIR) filtering. In at least one embodiment, the present invention implements a FIR filter using three data points, x–1, x, and x+1. In at least one embodiment, the present invention implements a FIR filter using five data points, x–2, x–1, x, x+1, and x+2. In at least one embodiment, the present invention implements a FIR filter using seven data points, x–3, x–2, x–1, x, x+1, x+2, and x+3.

In at least one embodiment, the present invention implements a FIR filter using identical coefficients, which would effectively result in an average of the datapoints. In at least one embodiment, the present invention implements a FIR filter using different coefficients. In at least one embodiment, the present invention implements a FIR filter using five data points and the following coefficients: 0.25(x–2), 0.4(x–1), 0.6(x), 0.4(x+1), and 0.25(x+2). Additional, or fewer, data points and/or coefficients, as well as different coefficients, can be used in one or more embodiments.

In at least one embodiment, as shown in FIG. 13, the present invention implements a FIR filter using five data points and the following coefficients: 1(x–2), 1(x–1), 1(x), 1(x+1), and 1(x+2). Thus, for the example shown in FIG. 13, the FIR result for the period associated with the pulse received at 2390 μs is 202 μs, which is the average of the adjacent data points, 200, 200, 190, 210, and 210.

Thus, it can be seen that using FIR filtering can be used to provide higher resolution and/or more accurate level determinations than the components of the sensor 200 are otherwise able to provide. Furthermore, it can be seen, having read the instant disclosure that the FIR filter, or another filter scheme, can be used to blur or diminish the effect of slight errors in the timing of the pulses and periods, while focusing results on the proper periods. For example, as shown in FIG. 13, FIR filtered periods include values of 195 μs, 198 μs, 200 μs, 202 μs, and 204 μs, with raw, detected periods of 180 μs, 190 μs, 200 μs, 210 μs, and 220 μs. Thus, FIR filtering can be used to better focus in on the true time-of-flight, which is assumed to be around 200 μs according to the example provided in FIG. 13.

Of course, other numbers of data points and/or other coefficients can be used. Any of the methods of the present invention, such as methods 1000, 1100, 1400, 1500, and 1700, can use this FIR filtering, either alone or in combination with other scoring, weighting methodologies. Any of the methods of the present invention, such as methods 1000, 1100, 1400, 1500, and 1700, can use FIR filtering, either alone or in combination with other scoring, weighting methodologies at different points in the methods and/or on different values, such as that described in connection with FIGS. 19-21.

FIG. 13 reflects that, similar to FIG. 12, 200 μs would be selected as the period most likely to reflect the true time-of-flight of the energy pulse between the sensor 200 and the fluid level 350. While the method of FIG. 10 would stop there, the method of FIG. 11 would then calculate a weighted average of 199.922 μs, as shown in step 1112.

Step 1114 of method 1100, as shown in FIG. 11, can also be similar to step 1014 of method 1000, as shown in FIG. 10, and in at least one embodiment, step 1114 is identical to step 1014. Thus, as shown in step 1114 of FIG. 11, the method 1100 can continue by the control circuitry 230 determining a distance between the level of the fluid and the wall of the tank according to the scoring utilizing at least two of the periods. For further explanation of step 1114, the reader is directed to the description of step 1014. The method 1100 can continue by providing a signal indicative of the level in the tank, as described above in connection with method 1000.

Comparing FIG. 10 to FIG. 14, one can see that method 1400, as shown in FIG. 14, can be similar to method 1000, as shown in FIG. 10. For example, step 1402 of method 1400, as shown in FIG. 14, can be similar to step 1002 of method 1000, as shown in FIG. 10, and in at least one embodiment, step 1402 is identical to step 1002. Thus, as shown in FIG. 14, a method 1400 of measuring a level 350 of a fluid in a tank 300 can begin by the sensor 200 transmitting an energy pulse from an emitter, or transducer, mounted to a wall 302 of the tank 300, as shown in step 1402. For further explanation of step 1402, the reader is directed to the description of step 1002.

Similarly, step 1404 of method 1400, as shown in FIG. 14, can be similar to step 1004 of method 1000, as shown in FIG. 10, and in at least one embodiment, step 1404 is identical to step 1004. Thus, as shown in in step 1404 of FIG. 14, the method 1400 can continue by the sensor 200 detecting a plurality of return, or reflected, pulses at a detector, or transducer, mounted to the wall 302 of the tank 300. For further explanation of step 1404, the reader is directed to the description of step 1004.

Likewise, step 1406 of method 1400, as shown in FIG. 14, can be similar to step 1006 of method 1000, as shown in FIG. 10, and in at least one embodiment, step 1406 is identical to step 1006. Thus, as shown in step 1406 of FIG. 14, the method 1400 can continue by the control circuitry 230 of the sensor 200 calculating, timing, or otherwise determining a plurality of periods between the pulses. For further explanation of step 1406, the reader is directed to the description of step 1006.

As shown in step 1408, the method 1400 can continue by the control circuitry 230 of the sensor 200 scoring, or weighting, at least two of the periods. As shown in FIG. 14, step 1408 includes scoring, or weighting, the periods according to the amplitudes of the associated pulses. In at least one embodiment, step 1408 can include decrementing weights associated with subsequent periods, as reflected in FIG. 12 and/or FIG. 16. In at least one embodiment, step 1408 can replace scoring, or weighting, the periods according to the amplitudes of the associated pulses, as shown, with decrementing weights associated with subsequent periods, as reflected in FIG. 12. For further explanation of step 1408, the reader is directed to the description of step 1009 and FIG. 12.

As shown in step 1410, the method 1400 can continue by the control circuitry 230 of the sensor 200 scoring, or weighting, utilizing delta weighting as explained in connection with FIG. 13. In at least one embodiment, step 1410 of method 1400 can include FIR filtering as explained in connection with FIG. 13. In at least one embodiment, step 1410 of method 1400 can replace delta weighting with FIR filtering. For further explanation of step 1410, the reader is directed to the description of FIG. 13.

Step 1414 of method 1400, as shown in FIG. 14, can also be similar to step 1014 of method 1000, as shown in FIG. 10, and in at least one embodiment, step 1414 is identical to step 1014. Thus, as shown in step 1414 of FIG. 14, the method 1400 can continue by the control circuitry 230 determining a distance between the level of the fluid and the wall of the tank according to the scoring utilizing at least two of the periods. For further explanation of step 1414, the reader is directed to the description of step 1014. The method 1400 can continue by providing a signal indicative of the level in the tank, as described above in connection with method 1000.

Comparing FIG. 10 to FIG. 15, one can see that method 1500, as shown in FIG. 15, can be similar to method 1000, as shown in FIG. 10. For example, step 1502 of method 1500, as shown in FIG. 15, can be similar to step 1002 of method 1000, as shown in FIG. 10, and in at least one embodiment, step 1502 is identical to step 1002. Thus, as shown in FIG. 15, a method 1500 of measuring a level 350 of a fluid in a tank 300 can begin by the sensor 200 transmitting an energy pulse from an emitter, or transducer, mounted to a wall 302 of the tank 300, as shown in step 1502. For further explanation of step 1502, the reader is directed to the description of step 1002.

Similarly, step 1504 of method 1500, as shown in FIG. 15, can be similar to step 1004 of method 1000, as shown in FIG. 10, and in at least one embodiment, step 1504 is identical to step 1004. Thus, as shown in in step 1504 of FIG. 15, the method 1500 can continue by the sensor 200 detecting a plurality of return, or reflected, pulses at a detector, or transducer, mounted to the wall 302 of the tank 300. For further explanation of step 1504, the reader is directed to the description of step 1004.

Likewise, step 1506 of method 1500, as shown in FIG. 15, can be similar to step 1006 of method 1000, as shown in FIG. 10, and in at least one embodiment, step 1506 is identical to step 1006. Thus, as shown in step 1506 of FIG. 15, the method 1500 can continue by the control circuitry 230 of the sensor 200 calculating, timing, or otherwise determining a plurality of periods between the pulses. For further explanation of step 1506, the reader is directed to the description of step 1006.

Step 1508 of method 1500, as shown in FIG. 15, can be similar to step 1408 of method 1400, as shown in FIG. 14, and in at least one embodiment, step 1508 is identical to step 1408. Thus, as shown in step 1508 of FIG. 15, the method 1500 can continue by the control circuitry 230 of the sensor 200 scoring, or weighting, at least two of the periods. As shown in FIG. 15, step 1508 includes scoring, or weighting, the periods according to the amplitudes of the associated pulses. In at least one embodiment, step 1508 can include decrementing weights associated with subsequent periods, as reflected in FIG. 12 and/or FIG. 16. In at least one embodiment, step 1508 can replace scoring, or weighting, the periods according to the amplitudes of the associated pulses, as shown, with decrementing weights associated with subsequent periods, as reflected in FIG. 12. For further explanation of step 1508, the reader is directed to the description of step 1408, step 1009, and FIG. 12.

Step 1510 of method 1500, as shown in FIG. 15, can be similar to step 1410 of method 1400, as shown in FIG. 14, and in at least one embodiment, step 1510 is identical to step 1410. Thus, as shown in step 1510 of FIG. 15, the method 1500 can continue by the control circuitry 230 of the sensor 200 scoring, or weighting, utilizing delta weighting as explained in connection with FIG. 13. In at least one embodiment, step 1510 of method 1500 can include FIR filtering as explained in connection with FIG. 13. In at least one embodiment, step 1510 of method 1500 can replace delta weighting with FIR filtering. For further explanation of step 1510, the reader is directed to the description of FIG. 13.

Referring also to FIG. 16, another example of scoring, or weighting, is provided with sample, fictitious data. Comparing FIG. 16 to FIG. 13 and FIG. 12, one can see similarities. For example, the same fictitious pulses, timing, and periods are reflected in all three figures. However, FIG. 16 utilizes the attenuation/amplitude or decremental weighting reflect in FIG. 12, as well as the FIR filtering and delta weighting reflected in FIG. 13. As in FIG. 12, the attenuation/amplitude or decremental weighting results in each antecedent, or preceding, period being scored higher than all subsequent periods. As in FIG. 13, the delta weighting is performed on the results of the FIR filtering, and also results in each antecedent, or preceding, period being scored higher than all subsequent periods. As shown in FIG. 16, a final weight is assigned to each period, or pulse, by multiplying the attenuation/amplitude or decremental weighting by the delta weighting, thereby utilizing attenuation/amplitude or decremental weighting, FIR filtering, and delta weighting. This final weight is shown in the right-hand column of FIG. 16 labelled "Weight". As shown, this final weighting results in each antecedent, or preceding, period being scored higher than all subsequent periods, which would have the effect that each antecedent period is more influential than the subsequent periods in determining the level 350 in the tank.

FIG. 16 reflects that, similar to FIG. 12 and FIG. 13, 200 μs would be selected as the period most likely to reflect the true time-of-flight of the energy pulse between the sensor 200 and the fluid level 350. While the method of FIG. 14 would stop there, the method of FIG. 15 would then calculate a weighted average of 199.922 µs, as shown in step 1512.

Step 1514 of method 1100, as shown in FIG. 11, can also be similar to step 1014 of method 1000, as shown in FIG. 10, and in at least one embodiment, step 1514 is identical to step 1014. Thus, as shown in step 1514 of FIG. 15, the method 1500 can continue by the control circuitry 230 determining a distance between the level of the fluid and the wall of the tank according to the scoring utilizing at least two of the periods. For further explanation of step 1514, the reader is directed to the description of step 1014. The method 1500 can continue by providing a signal indicative of the level in the tank, as described above in connection with method 1000.

Comparing FIG. 10 to FIG. 17, one can see that method 1700, as shown in FIG. 17, can be similar to method 1000, as shown in FIG. 10. For example, step 1702 of method 1700, as shown in FIG. 17, can be similar to step 1002 of method 1000, as shown in FIG. 10, and in at least one embodiment, step 1702 is identical to step 1002. Thus, as shown in FIG. 17, a method 1700 of measuring a level 350 of a fluid in a tank 300 can begin by the sensor 200 transmitting an energy pulse from an emitter, or transducer, mounted to a wall 302 of the tank 300, as shown in step 1702. For further explanation of step 1702, the reader is directed to the description of step 1002.

Similarly, step 1704 of method 1700, as shown in FIG. 17, can be similar to step 1004 of method 1000, as shown in FIG. 10, and in at least one embodiment, step 1704 is identical to step 1004. Thus, as shown in in step 1704 of FIG. 17, the method 1700 can continue by the sensor 200 detecting a plurality of return, or reflected, pulses at a detector, or transducer, mounted to the wall 302 of the tank 300. For further explanation of step 1704, the reader is directed to the description of step 1004.

Likewise, step 1706 of method 1700, as shown in FIG. 17, can be similar to step 1006 of method 1000, as shown in FIG. 10, and in at least one embodiment, step 1706 is identical to step 1006. Thus, as shown in step 1706 of FIG. 17, the method 1700 can continue by the control circuitry 230 of the sensor 200 calculating, timing, or otherwise determining a plurality of periods between the pulses. For further explanation of step 1706, the reader is directed to the description of step 1006.

As shown in step 1709, the method 1700 can continue by the control circuitry 230 of the sensor 200 selecting the period most likely to reflect the true time-of-flight of the energy pulse between the sensor 200 and the fluid level 350 utilizing any one of, or combination of, the scoring and/or filtering methodologies discussed herein. For example, in at least one embodiment, step 1709 includes utilizing FIR filtering and calculating a weighted average of the filtering results. In at least one embodiment, step 1709 includes utilizing FIR filtering and decremental weighting. In at least one embodiment, step 1709 includes utilizing FIR filtering and amplitude/attenuation weighting. In at least one embodiment, step 1709 includes utilizing amplitude/attenuation weighting and decremental weighting. In at least one embodiment, step 1709 includes utilizing amplitude/attenuation weighting and delta weighting without FIR filtering. In at least one embodiment, step 1709 includes utilizing decremental weighting and delta weighting without FIR filtering. In at least one embodiment, step 1709 includes utilizing an incremental weighting, which is the opposite of the decremental weighting described herein. In at least one embodiment, step 1709 includes utilizing an amplification weighting, which would cancel and/or oppose the amplitude/attenuation weighting described herein.

Step 1714 of method 1700, as shown in FIG. 17, can also be similar to step 1014 of method 1000, as shown in FIG. 10, and in at least one embodiment, step 1714 is identical to step 1014. Thus, as shown in step 1714 of FIG. 17, the method 1700 can continue by the control circuitry 230 determining a distance between the level of the fluid and the wall of the tank according to the scoring utilizing at least two of the periods. For further explanation of step 1714, the reader is directed to the description of step 1014. The method 1700 can continue by providing a signal indicative of the level in the tank, as described above in connection with method 1000.

The weighting, scoring, and/or filtering described above can be performed differently than that described above. For example, weighting, scoring, and/or filtering described above can be performed in different orders and/or to different values than that described above.

Referring also to FIG. 18, another example of scoring, or weighting, is provided with sample, fictitious data. Comparing FIG. 18 to FIG. 12, FIG. 13, and FIG. 16, one can see similarities. For example, the same fictitious pulses, timing, and periods are reflected in both figures. However, FIG. 18 different amplitude weighting than that of FIGS. 12 and 16. As shown in FIG. 18, one might see a less linear drop on the amplitudes of the return pulses, due to real world attenuation for example. This more realistic attenuation, and thus nonlinear amplitude drop, still results in each antecedent, or preceding, period being scored higher than all subsequent periods, which would have the effect that each antecedent period is more influential than the subsequent periods in determining the level 350 in the tank.

FIG. 18 also utilizes delta weighting differently than that explained with reference to FIG. 13 and FIG. 16. The delta weighing in FIG. 18 utilizes a different formula than that of FIG. 13 and FIG. 16 to calculate the delta weighting value of each period. In FIG. 18, the delta weighting is performed on the time the pulse is received, as opposed to the result of the FIR filtering. the delta weighting value is determined by subtracting the time of the pulse associated with each period from a constant (10,000 in the example of FIG. 18), and dividing the difference by the constant. Because the time the pulses are received increases with each subsequent period, this still results in each antecedent, or preceding, period being scored higher than all subsequent periods, which would have the effect that each antecedent period is more influential than the subsequent periods in determining the level 350 in the tank.

As shown in FIG. 18, a final weight is assigned to each period, or pulse, by multiplying the attenuation/amplitude or decremental weighting by the delta weighting, thereby utilizing attenuation/amplitude or decremental weighting and delta weighting. This final weight is shown in the right-hand column of FIG. 18 labelled "Weight". As shown, this final weighting results in each antecedent, or preceding, period being scored higher than all subsequent periods, which would have the effect that each antecedent period is more influential than the subsequent periods in determining the level 350 in the tank.

In the table of FIG. 19, a tabular histogram is constructed, tabulating the different weights associated with the different fictitious periods of the example provided in FIG. 18. For purposes of the example provided in FIG. 18, the period of 180 µs occurred once and was assigned a total weight, or score, of 0.59. For purposes of the example provided in FIG. 18, the period of 190 µs occurred eight times and was assigned a total weight, or score, of 1.36, which is the summation of the weights associated with each occurrence of the 190 µs period in the fictitious example provided in FIG. 18. For purposes of the example provided in FIG. 18, the period of 200 µs occurred twelve times and was assigned a total weight, or score, of 2.11. For purposes of the example provided in FIG. 18, the period of 210 µs occurred eight times and was assigned a total weight, or score, of 1.58. For purposes of the example provided in FIG. 18, the period of 220 µs occurred once and was assigned a total weight, or score, of 0.02.

Any or all of the methods described herein, such as method 1000, method 1100, method 1400, method 1500, and method 1700 can select 200 µs as the period most likely to reflect the true time-of-flight of the energy pulse between the sensor 200 and the fluid level 350, because 200 µs received the highest weighting, or scoring, in the samples of FIG. 18. In at least one embodiment, however, the present inventions then apply a FIR filter to the tabular histogram of FIG. 19.

In the example of FIG. 19, the FIR filter utilizes five data points and the following coefficients: 0.25(x−2), 0.4(x−1), 0.6(x), 0.4(x+1), and 0.25(x+2). Any or all of the methods described herein, such as method 1000, method 1100, method 1400, method 1500, and method 1700 can select 200 µs as the period most likely to reflect the true time-of-flight of the energy pulse between the sensor 200 and the fluid level 350, because 200 µs received the highest weighting, or scoring, by application of the FIR coefficients. Of course, additional, or fewer, data points and/or coefficients, as well as different coefficients, can be used in one or more embodiments.

In at least one embodiment, however, the present inventions then apply a weighted average based on the FIR coefficients. For the example of FIG. 19, any or all of the methods described herein, such as method 1000, method 1100, method 1400, method 1500, and method 1700 can apply a three-element weighted average centered on 200 µs, to include 190 µs, 200 µs, and 210 µs, resulting in 199.79 µs being selected as the period most likely to reflect the true time-of-flight of the energy pulse between the sensor 200 and the fluid level 350. Of course, additional, or fewer, elements can be applied in the weighted average in some embodiments.

In the table of FIG. 20, another tabular histogram is constructed, tabulating the different weights associated with the different fictitious periods of the example provided in FIG. 18. In the example provided in FIG. 20, however, those periods not receiving a final weight of at least 0.1 are ignored. Thus, for purposes of the example provided in FIG. 20, the period of 180 µs occurred once and was assigned a total weight, or score, of 0.59. For purposes of the example provided in FIG. 20, the period of 190 µs occurred twice and was assigned a total weight, or score, of 1.24. For purposes of the example provided in FIG. 20, the period of 200 µs occurred six times and was assigned a total weight, or score, of 2.05. For purposes of the example provided in FIG. 20, the period of 210 µs occurred three times and was assigned a total weight, or score, of 1.43. For purposes of the example provided in FIG. 20, the period of 220 µs did not occur, since the final weight assigned to the one occurrence previously noted was below 0.1 and therefore 220 µs is ignored in the example of FIG. 20.

Any or all of the methods described herein, such as method 1000, method 1100, method 1400, method 1500, and method 1700 can still select 200 µs as the period most likely to reflect the true time-of-flight of the energy pulse between the sensor 200 and the fluid level 350, because 200 µs received the highest weighting, or scoring, in the samples of FIG. 20. In at least one embodiment, however, the present inventions then apply a FIR filter to the tabular histogram of FIG. 20.

In the example of FIG. 20, the FIR filter utilizes five data points and the following coefficients: 0.25(x−2), 0.4(x−1), 0.6(x), 0.4(x+1), and 0.25(x+2). Any or all of the methods described herein, such as method 1000, method 1100, method 1400, method 1500, and method 1700 can still select 200 µs as the period most likely to reflect the true time-of-flight of the energy pulse between the sensor 200 and the fluid level 350, because 200 µs received the highest weighting, or scoring, by application of the FIR coefficients. Of course, additional, or fewer, data points and/or coefficients, as well as different coefficients, can be used in one or more embodiments.

In at least one embodiment, however, the present inventions then apply a weighted average based on the FIR coefficients. For the example of FIG. 20, any or all of the methods described herein, such as method 1000, method 1100, method 1400, method 1500, and method 1700 can apply a three-element weighted average centered on 200 µs, to include 190 µs, 200 µs, and 210 µs, resulting in 199.74 µs being selected as the period most likely to reflect the true time-of-flight of the energy pulse between the sensor 200 and the fluid level 350. Of course, additional, or fewer, elements can be applied in the weighted average in one or more embodiments.

In the table of FIG. 21, yet another tabular histogram is constructed, tabulating the different weights associated with the different fictitious periods of the example provided in FIG. 18. In the example provided in FIG. 21, however, those periods associated with pulses having an amplitude less than 0.1 are ignored. In at least one embodiment, this can be considered an example of a noise threshold, i.e., ignoring the pulses, and thus the associated periods, having an amplitude below a noise threshold.

For purposes of the example provided in FIG. 21, the period of 180 µs occurred once and was assigned a total weight, or score, of 0.59. For purposes of the example provided in FIG. 21, the period of 190 µs occurred twice and was assigned a total weight, or score, of 1.24. For purposes of the example provided in FIG. 21, the period of 200 µs occurred six times and was assigned a total weight, or score, of 2.05. For purposes of the example provided in FIG. 21, the period of 210 µs occurred four times and was assigned a total weight, or score, of 1.51. For purposes of the example provided in FIG. 21, the period of 220 µs did not occur, since the amplitude of the pulse associated with the one occurrence previously noted was below the 0.1 noise threshold and therefore 220 µs is ignored in the example of FIG. 21.

Any or all of the methods described herein, such as method 1000, method 1100, method 1400, method 1500, and method 1700 can still select 200 µs as the period most likely to reflect the true time-of-flight of the energy pulse between the sensor 200 and the fluid level 350, because 200 µs received the highest weighting, or scoring, in the samples of FIG. 21. In at least one embodiment, however, the present inventions then apply a FIR filter to the tabular histogram of FIG. 21.

In the example of FIG. 21, the FIR filter utilizes five data points and the following coefficients: 0.25(x−2), 0.4(x−1), 0.6(x), 0.4(x+1), and 0.25(x+2). Any or all of the methods described herein, such as method 1000, method 1100, method 1400, method 1500, and method 1700 can still select 200 µs as the period most likely to reflect the true time-of-flight of the energy pulse between the sensor 200 and the fluid level 350, because 200 μs received the highest weighting, or scoring, by application of the FIR coefficients. Of course, additional, or fewer, data points and/or coefficients, as well as different coefficients, can be used in one or more embodiments.

In at least one embodiment, however, the present inventions then apply a weighted average based on the FIR coefficients. For the example of FIG. 21, any or all of the methods described herein, such as method 1000, method 1100, method 1400, method 1500, and method 1700 can apply a three-element weighted average centered on 200 μs, to include 190 μs, 200 μs, and 210 μs, resulting in 199.79 μs being selected as the period most likely to reflect the true time-of-flight of the energy pulse between the sensor 200 and the fluid level 350. Of course, additional, or fewer, elements can be applied in the weighted average in some embodiments.

Any or all of the methods described herein, such as method 1000, method 1100, method 1400, method 1500, and method 1700 can be triggered, or performed, periodically. For example, in at least one embodiment, any or all of the methods described herein can be performed three times every second. In at least one embodiment, any or all of the methods described herein can be performed every second. In at least one embodiment, any or all of the methods described herein can be performed every three seconds. Any or all of the methods described herein can be triggered, or performed, between once every tenth of a second to once every minute.

Any or all of the methods described herein, such as method 1000, method 1100, method 1400, method 1500, and method 1700 can be triggered, or performed, on-demand. For example, in at least one embodiment, any or all of the methods described herein can be performed when the operator uses the interface 450 to request the tank level 350. In at least one embodiment, any or all of the methods described herein can be performed every three seconds while the operator actively requests the tank level 350, such as for example holding down a button on the interface 450.

Any or all of the methods described herein, such as method 1000, method 1100, method 1400, method 1500, and method 1700 can be triggered, or performed, through a combination of periodically and on-demand. For example, in at least one embodiment, any or all of the methods described herein can be performed at a faster rate for a duration, when the operator uses the interface 450 to request the tank level 350, and a slower rate thereafter. For example, in at least one embodiment, any or all of the methods described herein can be performed three times every second, for twenty seconds, when the operator uses the interface 450 to request the tank level 350. After the twenty seconds, any or all of the methods described herein can be performed once every second, once every three seconds, or once every ten seconds, for example. In at least one embodiment, any or all of the methods described herein can be performed three times every second, for twenty minutes, when the operator uses the interface 450 to request the tank level 350. For example, it can be presumed that the operator is watching or otherwise interested in more frequent updates to the level 350 determination. After the twenty minutes, any or all of the methods described herein can be performed once every second, once every three seconds, or once every ten seconds, for example, to preserve battery power and/or cellular data usage until the operator requests the tank level 350 through the interface 450 again.

The interface 450 can be updated with the most recent level 350 determination every time the method is performed. In at least one embodiment, the interface 450 can be updated with the most recent level 350 determination periodically, on-demand, or a combination thereof, as described above.

In at least one embodiment, the system 100 transmits one energy pulse, detects multiple return pulses as reflections of that one energy pulse, and determines the tank level 350 based on the multiple return pulses of the one energy pulse. In at least one embodiment, the system 100 transmits one energy pulse, and determines the tank level 350 again, periodically, on-demand, or a combination of the two as discussed herein.

Traditional ultrasonic level sensors can have a blind zone close to the sensor. For example, return pulses cannot be detected while the sensor's transducer continues vibrating after transmitting an energy pulse. Because there is a duration of time, after transmitting an energy pulse, that the sensor is effectively blind to return pulses, traditional ultrasonic level sensors have a minimum distance that they can measure, this distance being proportional to the duration that the sensor's transducer continues vibrating after transmitting an energy pulse.

Using the filtering, weighting, and/or scoring of multiple pulses, and thus periods, as described herein, the present inventions can overcome such limitations. For example, where the level 350 is so close to the sensor 200 that the first return pulse, or echo is not detected, the filtering, weighting, and/or scoring of multiple pulses, and thus multiple periods, allows the various embodiments of the present inventions to still select the period most likely to reflect the true distance and thus the true level 350 of the tank 300.

In at least one embodiment, system 100 or a component thereof, such as sensor 200, can comprise one or more aspects or features of one or more embodiments disclosed in Applicants' co-pending U.S. patent application Ser. No. 16/801,135 filed Feb. 25, 2020, the entire contents of which are hereby incorporated by reference herein.

As will be appreciated by one of ordinary skill in the art having the benefits of the present disclosure, aspects of the embodiments can be embodied as a system, method or computer program product. Accordingly, aspects of the present embodiments can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing. Computer program code for carrying out operations for aspects of the present disclosure can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present disclosure can be and/or are described with reference to flowchart illustrations and/or block diagrams of methods, apparatus (systems) and computer program products according to embodiments of the disclosure. Each block of a flowchart illustration and/or block diagram, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can also be stored in a computer readable medium (which can be or include any non-transitory computer readable media) that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other device(s) to produce a computer implemented process such that the instructions which execute on the computer or other programmable apparatus provide processes for implementing the functions/acts specified in a flowchart and/or block diagram block or blocks.

In at least one embodiment, a system for measuring liquid height in a tank can include one or more sensors configured to couple to the tank. A sensor can include a housing having an interior and one or more transducers, such as a single transducer or multiple transducers, coupled to the housing, which can include being disposed wholly or partially therein and which can include being disposed in sensing communication with one or more openings or walls of the housing. A sensor can be configured to transmit one or more acoustic pulses from the top of a tank downwardly or in a downward direction for measuring height of a liquid beneath the transducer.

In at least one embodiment, a sensor can include one or more controllers disposed within the housing and operatively connected to the transducer. In at least one embodiment, a sensor can include one or more batteries or other power sources disposed within or coupled to the housing and operatively connected to the transducer and/or to one or more other system components, such as a controller. In at least one embodiment, a sensor can include one or more wireless modules disposed within the housing and operatively connected to the controller, such as for communication with an external receiver, such as a display module, smart phone, computer or other receiver. In at least one embodiment, a sensor can include or have access to a non-transitory machine-readable memory with instructions recorded thereon that cause a controller to generate an acoustic pulse with a transducer, receive a reflected acoustic pulse with the transducer, and provide an advertisement packet to a display module indicative of a time interval between generation of the acoustic pulse and receipt of the reflected acoustic pulse and/or information based on such time interval.

In at least one embodiment, a sensor can include a housing configured to be coupled in sensing communication with a tank interior, such as a tank comprising liquid. The housing can include a sensing side or end configured to be disposed in sensing communication with a liquid interface within the tank and an opposite side or end configured to at least partially enclose the housing for protecting one or more components disposed in the housing. One or more piezo elements can be mounted within the housing in sensing arrangement with the sensing side of the housing. In at least one embodiment, the sensing side can be configured to be coupled to an exterior surface of a tank or tank wall and the sensor can be configured to sense liquid level through the wall of the tank and/or the wall of the sensor housing. In at least one embodiment, at least a portion of the sensor housing can be configured to be disposed in a recess or partial bore formed in a tank wall. In at least one embodiment, one or more piezo elements can be disposed in direct sensing communication with an outer surface of a tank or tank wall. In at least one embodiment, one or more piezo elements can be disposed in direct sensing communication with an inner surface of the sensor housing and an outer surface of the sensor housing can be disposed in direct sensing communication with an outer surface of a tank or tank wall. Such direct sensing communication can but need not include the presence of a couplant, such as an elastomeric pad, gel, adhesive or other substance for facilitating sensing communication through one or more walls.

In at least one embodiment, at least a portion of the sensor housing can be configured to be disposed in of through a hole or opening through a tank wall and one or more piezo elements can be disposed in direct or indirect sensing communication with a liquid interface within the tank. A bottom surface or other sensing side of the sensor can be disposed flush with, interior of or exterior of an inner surface of a tank wall. In such an embodiment, which is but one of many, the sensor housing can be configured to hold one or more piezo elements at least partially interior of an exterior boundary, such as the outside surface, of a tank. In at least one embodiment, the sensing side of a sensor housing can be closed. In at least one embodiment, the sensing side of a sensor housing can be at least partially open, such as for allowing fluid communication between a piezo element or a transducer and air or other fluid existing between the sensor and a liquid within the tank (or with the liquid itself). In at least one embodiment, the sensing side of a sensor housing can include a deflector or reflector having one or more surfaces configured to direct sensing reflections onto or toward one or more transducers or piezo elements, whether directly or indirectly. In at least one embodiment, the sensing side of a sensor housing can include one or more cavities within the housing and a transducer or piezo element can be disposed at least partially within a cavity in direct or indirect sensing and/or fluid communication with a tank interior.

In at least one embodiment, a method of determining height of liquid disposed beneath a transducer can include acoustically coupling a transducer to a tank top, generating an acoustic pulse with the transducer, communicating the acoustic pulse through space such as air space above liquid in the tank, reflecting the acoustic pulse from a surface of the liquid, receiving the reflected acoustic pulse, calculating a time interval between generating the acoustic pulse and receiving the reflected acoustic pulse, and determining height a of the liquid based on the calculated time interval. In at least one embodiment, a method can include providing an indication of a liquid level to a user interface remote from a transducer, sensor and/or tank. In at least one embodiment, a method can include recording acoustic pulses received at a transducer, such as in the form of a waveform, compressing the waveform, identifying one or more peaks in the waveform, creating an advertisement package and/or transmitting an advertisement package to a display module, whether wirelessly or otherwise. In at least one embodiment, a method can include converting data into tank level information, including but not limited to by converting one or more peaks in a waveform into the height of liquid in a tank.

In at least one embodiment, a tank level monitoring system according to the disclosure can include one or more ultrasonic sensors configured to be coupled to the top of a tank and to assess liquid level in the tank in a top down direction. In at least one embodiment, a tank level monitoring system according to the disclosure can include one or more ultrasonic sensors configured to be coupled to the bottom of a tank and to assess liquid level in the tank in a bottom up direction. In at least one embodiment, a tank level monitoring system according to the disclosure can include one or more ultrasonic sensors configured to be coupled to the side of a tank and to assess liquid level in the tank in a horizontal or angled direction.

One or more sensors can be configured to couple to an exterior surface of a tank. One or more sensors can include or be in the form of a cap or plug configured to couple to a tank. One or more sensors can be configured to sense tank level through one or more barriers, such as the wall of a tank or sensor body. One or more sensors can be configured to sense tank level through an opening in a sensor body disposed in fluid communication with space, such as air space, between the sensor and liquid residing in the tank.

In at least one embodiment, a method of measuring a level of a fluid in a tank according to the disclosure can include transmitting an energy pulse from an emitter mounted to a wall of the tank and detecting a plurality of return pulses at a detector mounted to the wall of the tank. A plurality of periods between the pulses can be calculated or timed. In at least one embodiment, at least two of the periods are scored or weighted. In at least one embodiment, a distance between the fluid and the top of the tank can be calculated or determined according to the scoring utilizing at least two of the periods. In at least one embodiment, a signal indicative of the level in the tank can then be provided. The signal can be inversely related to the distance between the fluid and the top of the tank.

In at least one embodiment, a tank level monitoring system according to the disclosure can include a housing configured to be secured to a wall of a fluid containment tank, a transducer within the housing, and control circuitry within the housing and electrically coupled to the transducer.

In at least one embodiment, the circuitry can cause the transducer to generate an energy pulse into the tank and utilize the transducer to detect return pulses reflected from a fluid/air interface in the tank. In at least one embodiment, the circuitry can also time a plurality of periods between the pulses, score at least two of the periods, and determine a distance between the fluid/air interface and the wall of the tank according to the scoring utilizing at least two of the periods. In at least one embodiment, the circuitry can also provide a signal indicative of a fluid level in the tank. The signal can be inversely related to the distance between the fluid/air interface and the wall of the tank.

Other and further embodiments utilizing one or more aspects of the disclosure can be devised without departing from the spirit of Applicants' disclosure. For example, the devices, systems and methods can be implemented for tanks in numerous different industries. Further, the various methods and embodiments of the sensors and sensor arrangements can be included in combination with each other to produce variations of the disclosed methods and embodiments. Discussion of singular elements can include plural elements and vice-versa. The order of steps can occur in a variety of sequences unless otherwise specifically limited. The various steps described herein can be combined with other steps, interlineated with the stated steps and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

What is claimed is:

1. A method of measuring a level of a liquid/air interface of a fluid in a tank, the method comprising:
    transmitting an energy pulse from an emitter mounted to
        a wall of the tank;

detecting a plurality of return pulses at a detector mounted to the wall of the tank, each of the return pulses being reflections of the energy pulse from the liquid/air interface;

timing a plurality of periods between the return pulses, including at least a first period, a second period subsequent to the first period, and a third period subsequent to the second period;

scoring at least the first, second and third periods, including scoring the first period higher than the second period and scoring the second period higher than the third period;

determining a distance between the level of the fluid and the wall of the tank according to the scoring of the periods;

calculating the level of the fluid in the tank based at least in part on the distance; and providing a signal indicative of the level of the fluid in the tank.

2. The method of claim 1, wherein at least two of the first, second and third periods are scored differently than any other one of the plurality of periods.

3. The method of claim 1, wherein selected ones of the return pulses are ignored, such that the periods associated with the selected ones of the return pulses are not utilized in the determining.

4. The method of claim 1, wherein the first period is a period between the energy pulse and a first return pulse.

5. The method of claim 4, wherein the first period is more influential than any subsequent period in the determining.

6. The method of claim 4, wherein the first period is scored higher than all subsequent periods.

7. The method of claim 1, wherein the emitter and the detector are embodied in a single transducer which performs both the transmitting and the detecting.

8. The method of claim 7, wherein the transducer is mounted flush with an inner surface of the wall of the tank.

9. The method of claim 7, wherein the transducer detects the return pulses utilizing the wall of the tank.

* * * * *